US012209417B2

(12) United States Patent
Pervan

(10) Patent No.: US 12,209,417 B2
(45) Date of Patent: Jan. 28, 2025

(54) MECHANICAL LOCKING SYSTEM FOR FLOOR PANELS

(71) Applicant: Ceraloc Innovation AB, Viken (SE)

(72) Inventor: Darko Pervan, Viken (SE)

(73) Assignee: CERALOC INNOVATION AB, Viken (SE)

(*) Notice: Subject to any disclaimer, the term of this patent is extended or adjusted under 35 U.S.C. 154(b) by 0 days.

(21) Appl. No.: 18/295,559

(22) Filed: Apr. 4, 2023

(65) Prior Publication Data

US 2023/0235573 A1 Jul. 27, 2023

Related U.S. Application Data

(63) Continuation of application No. 16/854,343, filed on Apr. 21, 2020, now Pat. No. 11,649,642, which is a (Continued)

(30) Foreign Application Priority Data

Aug. 29, 2011 (SE) .................................... 1150778-7
Sep. 6, 2011 (SE) .................................... 1150803-3

(51) Int. Cl.
*E04F 15/02* (2006.01)
*B26D 1/14* (2006.01)
(Continued)

(52) U.S. Cl.
CPC .......... *E04F 15/02038* (2013.01); *B26D 1/14* (2013.01); *B26D 3/06* (2013.01);
(Continued)

(58) Field of Classification Search
CPC ...... E04F 2201/0138; E04F 2201/0146; E04F 2201/0541; E04F 2201/0161;
(Continued)

(56) References Cited

U.S. PATENT DOCUMENTS 213,740 A 4/1879 Conner
1,394,120 A 10/1921 Rockwell
(Continued)

FOREIGN PATENT DOCUMENTS

CA 1146551 A 5/1983
CA 2252791 A1 5/1999
(Continued)

OTHER PUBLICATIONS

Decision to grant a European patent received for European Application No. 12826931, mailed on May 16, 2019, 2 pages.
(Continued)

*Primary Examiner* — Christine T Cajilig
(74) *Attorney, Agent, or Firm* — Boone IP Law

(57) ABSTRACT

Building panels provided with a locking system for vertical and horizontal locking of a first edge and a second edge of adjacent panels. The locking system includes a displaceable tongue at least partly arranged in a displacement groove, a tongue groove, a cavity provided in a strip at the first edge, and a protrusion extending downwards at the second edge. The displaceable tongue is arranged to be displaced at least partly into the tongue groove during locking, and wherein the protrusion is arranged to be located in least a portion of the cavity when the panels are locked vertically and horizontally.

18 Claims, 22 Drawing Sheets

Related U.S. Application Data continuation of application No. 16/027,711, filed on Jul. 5, 2018, now Pat. No. 10,669,724, which is a continuation of application No. 15/614,962, filed on Jun. 6, 2017, now Pat. No. 10,066,400, which is a continuation of application No. 15/164,291, filed on May 25, 2016, now Pat. No. 9,758,972, which is a continuation of application No. 15/067,999, filed on Mar. 11, 2016, now Pat. No. 9,714,515, which is a continuation of application No. 13/596,988, filed on Aug. 28, 2012, now Pat. No. 9,314,936.

(51) Int. Cl.
*B26D 3/06* (2006.01)
*E04C 2/38* (2006.01)
*E04C 2/40* (2006.01)
*E04F 15/10* (2006.01)
*E04F 15/18* (2006.01)
*B26D 1/00* (2006.01)

(52) U.S. Cl.
CPC .................. *E04C 2/38* (2013.01); *E04C 2/40* (2013.01); *E04F 15/102* (2013.01); *E04F 15/107* (2013.01); *E04F 15/18* (2013.01); *B26D 2001/0053* (2013.01); *B26D 2001/006* (2013.01); *E04F 2201/0146* (2013.01); *E04F 2201/0153* (2013.01); *E04F 2201/021* (2013.01); *E04F 2201/041* (2013.01); *E04F 2201/0547* (2013.01); *E04F 2203/08* (2013.01); *Y10T 83/0448* (2015.04); *Y10T 83/0524* (2015.04)

(58) Field of Classification Search
CPC .... E04F 2201/021; E04F 2201/028041; E04F 2201/0511; E04F 2201/0523; E04F 2201/0153
See application file for complete search history.

(56) References Cited

U.S. PATENT DOCUMENTS 1,787,027 A 12/1930 Wasleff
1,925,070 A 8/1933 Livezey
2,004,917 A 6/1935 Johnson
2,015,813 A 10/1935 Nielsen
2,031,596 A 2/1936 Fulbright
2,088,238 A 7/1937 Ray
2,089,075 A 8/1937 Siebs
2,266,464 A 12/1941 Kraft
2,269,927 A 1/1942 Crooks
2,303,745 A 12/1942 Karreman
2,306,295 A 12/1942 Casto
2,324,628 A 7/1943 Kahr
2,497,837 A 2/1950 Nelson
2,740,167 A 4/1956 Rowley
2,769,726 A 11/1956 Wetterau et al.
2,818,895 A 1/1958 Zuber
2,872,712 A 2/1959 Brown et al.
2,947,040 A 8/1960 Schultz
3,055,461 A 9/1962 De Ridder
3,087,269 A 4/1963 Hudson
3,120,083 A 2/1964 Dahlberg et al.
3,234,074 A 2/1966 Bryant
3,247,638 A 4/1966 Gay, Jr.
3,259,417 A 7/1966 Chapman
3,397,496 A 8/1968 Sohns
3,436,888 A 4/1969 Ottosson
3,538,665 A 11/1970 Gohner
3,554,850 A 1/1971 Kuhle
3,578,548 A 5/1971 Wesp
3,619,964 A 11/1971 Passaro et al.
3,694,983 A 10/1972 Couquet
3,720,027 A 3/1973 Christensen
3,742,669 A 7/1973 Mansfeld
3,760,547 A 9/1973 Brenneman
3,857,749 A 12/1974 Yoshida
3,908,053 A 9/1975 Hettich
3,919,820 A 11/1975 Green
3,937,861 A 2/1976 Zuckerman et al.
4,037,377 A 7/1977 Howell et al.
4,100,710 A 7/1978 Kowallik
4,113,399 A 9/1978 Hansen, Sr.
4,131,705 A * 12/1978 Kubinsky ................ B27N 5/00
264/108
4,172,169 A 10/1979 Mawson et al.
4,176,210 A 11/1979 Skinner
4,180,615 A 12/1979 Bettoli
4,187,131 A 2/1980 Graham et al.
4,196,554 A 4/1980 Anderson et al.
4,242,390 A 12/1980 Nemeth
4,299,070 A 11/1981 Oltmanns et al.
4,313,866 A 2/1982 Renshaw
4,333,987 A 6/1982 Kwart et al.
4,393,187 A 7/1983 Boba et al.
4,423,178 A 12/1983 Renshaw
4,426,820 A 1/1984 Terbrack et al.
4,489,115 A 12/1984 Layman et al.
4,507,188 A 3/1985 Chu
4,512,131 A 4/1985 Laramore
4,570,353 A 2/1986 Evans et al.
4,574,099 A 3/1986 Nixon
4,599,841 A 7/1986 Haid
4,614,680 A 9/1986 Fry et al.
4,772,500 A 9/1988 Stroppiana
4,785,065 A 11/1988 Uhl et al.
4,807,412 A 2/1989 Frederiksen
4,944,514 A 7/1990 Suiter
5,007,222 A 4/1991 Raymond
5,050,362 A 9/1991 Tal et al.
5,103,614 A 4/1992 Kawaguchi et al.
5,109,898 A 5/1992 Schacht
5,112,671 A 5/1992 Diamond et al.
5,134,026 A 7/1992 Melcher
5,148,850 A 9/1992 Urbanick
5,162,141 A 11/1992 Davey et al.
5,182,892 A 2/1993 Chase
5,185,193 A 2/1993 Phenicie et al.
5,190,799 A 3/1993 Ellingson, III
5,208,086 A 5/1993 Owens
5,229,217 A 7/1993 Holzer
5,295,341 A 3/1994 Kajiwara
5,333,429 A 8/1994 Cretti
5,344,700 A 9/1994 McGath et al.
5,349,796 A 9/1994 Meyerson
5,380,794 A 1/1995 Schaefer et al.
5,433,806 A 7/1995 Pasquali et al.
5,458,953 A 10/1995 Wang et al.
5,465,546 A 11/1995 Buse
5,502,939 A 4/1996 Zadok et al.
5,540,025 A 7/1996 Takehara et al.
5,548,937 A 8/1996 Shimonohara
5,618,602 A 4/1997 Nelson
5,670,237 A 9/1997 Shultz et al.
5,671,575 A 9/1997 Wu
5,694,730 A 12/1997 Del et al.
5,706,621 A 1/1998 Pervan
5,755,068 A 5/1998 Ormiston
5,797,237 A 8/1998 Finkell, Jr.
5,858,160 A 1/1999 Piacente et al.
5,879,781 A 3/1999 Mehta et al.
5,900,099 A 5/1999 Sweet et al.
5,927,126 A 7/1999 Biella
5,950,389 A 9/1999 Porter
6,006,486 A 12/1999 Moriau et al.
6,029,416 A 2/2000 Andersson
6,052,960 A 4/2000 Yonemura
6,065,262 A 5/2000 Motta
6,101,778 A 8/2000 Maartensson
6,139,945 A 10/2000 Krejchi et al.
6,156,402 A 12/2000 Smith
6,173,548 B1 1/2001 Hamar et al.

(56) References Cited

U.S. PATENT DOCUMENTS 6,182,410 B1 2/2001 Pervan
6,182,413 B1 2/2001 Magnusson
6,216,409 B1 4/2001 Roy et al.
6,233,899 B1 5/2001 Mellert et al.
6,291,078 B1 9/2001 Chen et al.
6,314,701 B1 11/2001 Meyerson
6,324,809 B1 12/2001 Nelson
6,332,733 B1 12/2001 Hamberger et al.
6,345,481 B1 2/2002 Nelson
6,363,677 B1 4/2002 Chen et al.
6,397,547 B1 6/2002 Maartensson
6,438,919 B1 8/2002 Knauseder
6,455,127 B1 9/2002 Valtanen
6,465,046 B1 10/2002 Hansson et al.
6,490,836 B1 12/2002 Moriau et al.
6,505,452 B1 1/2003 Hannig et al.
6,536,178 B1 3/2003 Paalsson et al.
6,546,691 B2 4/2003 Leopolder
6,553,724 B1 4/2003 Bigler
6,558,070 B1 5/2003 Valtanen
6,591,568 B1 7/2003 Paalsson
6,617,009 B1 9/2003 Chen et al.
6,647,690 B1 11/2003 Martensson
6,671,968 B2 1/2004 Shannon
6,672,030 B2 1/2004 Schulte
6,675,545 B2 1/2004 Chen et al.
6,695,944 B2 2/2004 Courtney
6,711,869 B2 3/2004 Tychsen
6,715,253 B2 4/2004 Pervan
6,729,091 B1 5/2004 Martensson
6,761,008 B2 7/2004 Chen et al.
6,763,643 B1 7/2004 Maartensson
6,766,622 B1 7/2004 Thiers
6,769,218 B2 8/2004 Pervan
6,769,219 B2 8/2004 Schwitte et al.
6,772,568 B2 8/2004 Thiers et al.
6,786,019 B2 9/2004 Thiers
6,790,512 B2 9/2004 MacQueen et al.
6,804,926 B1 10/2004 Eisermann
6,805,298 B1 * 10/2004 Corbett .................. F24D 3/142
165/56
6,851,237 B2 2/2005 Niese et al.
6,854,235 B2 2/2005 Martensson
6,862,857 B2 3/2005 Tychsen
6,865,855 B2 3/2005 Knauseder
6,874,292 B2 4/2005 Moriau et al.
6,880,305 B2 4/2005 Pervan et al.
6,880,307 B2 4/2005 Schwitte et al.
6,895,881 B1 5/2005 Whitaker
6,898,911 B2 5/2005 Kornfalt et al.
6,898,913 B2 5/2005 Pervan
6,918,220 B2 7/2005 Pervan
6,922,964 B2 8/2005 Pervan
6,922,965 B2 8/2005 Rosenthal et al.
6,928,779 B2 8/2005 Moriau et al.
6,933,043 B1 8/2005 Son et al.
6,953,105 B2 10/2005 Rust et al.
6,955,020 B2 10/2005 Moriau et al.
6,966,963 B2 11/2005 O'Connor
6,986,934 B2 1/2006 Chen et al.
7,051,486 B2 5/2006 Pervan
7,086,205 B2 8/2006 Pervan
7,090,430 B1 8/2006 Fletcher et al.
D528,671 S 9/2006 Grafenauer
7,121,058 B2 10/2006 Palsson et al.
7,127,860 B2 10/2006 Pervan et al.
7,137,229 B2 11/2006 Pervan
7,152,379 B2 12/2006 Lin et al.
7,155,871 B1 1/2007 Stone et al.
7,169,460 B1 1/2007 Chen et al.
7,171,791 B2 2/2007 Pervan
7,211,310 B2 5/2007 Chen et al.
7,251,916 B2 8/2007 Konzelmann et al.
7,275,350 B2 10/2007 Pervan et al.
7,328,536 B2 2/2008 Moriau et al.
7,337,588 B1 3/2008 Moebus
7,356,971 B2 4/2008 Pervan
7,377,081 B2 5/2008 Ruhdorfer
7,386,963 B2 6/2008 Pervan
7,398,625 B2 7/2008 Pervan
7,413,374 B2 8/2008 Rogers et al.
7,419,717 B2 9/2008 Chen et al.
7,454,875 B2 11/2008 Pervan et al.
7,516,588 B2 4/2009 Pervan
7,543,418 B2 6/2009 Weitzer
7,568,322 B2 8/2009 Pervan
7,584,583 B2 9/2009 Bergelin et al.
7,607,271 B2 10/2009 Griffin et al.
7,614,197 B2 11/2009 Nelson
7,617,645 B2 11/2009 Moriau et al.
7,621,094 B2 11/2009 Moriau et al.
7,634,886 B2 12/2009 Moriau et al.
7,634,887 B2 12/2009 Moriau et al.
7,637,066 B2 12/2009 Moriau et al.
7,640,708 B2 1/2010 Moriau et al.
7,644,555 B2 1/2010 Moriau et al.
7,644,557 B2 1/2010 Moriau et al.
7,647,743 B2 1/2010 Moriau et al.
7,650,728 B2 1/2010 Moriau et al.
7,654,054 B2 2/2010 Moriau et al.
7,658,048 B2 2/2010 Moriau et al.
7,678,215 B2 3/2010 Martin et al.
7,716,896 B2 5/2010 Pervan
7,739,849 B2 6/2010 Pervan
7,763,345 B2 7/2010 Chen et al.
7,779,597 B2 8/2010 Thiers et al.
7,802,415 B2 9/2010 Pervan et al.
7,836,497 B2 11/2010 Hossain et al.
7,841,150 B2 11/2010 Pervan
7,856,784 B2 12/2010 Martensson
7,856,789 B2 12/2010 Eisermann
7,861,482 B2 1/2011 Pervan et al.
7,866,115 B2 1/2011 Pervan et al.
7,886,497 B2 2/2011 Pervan
7,896,571 B1 3/2011 Hannig et al.
7,918,062 B2 4/2011 Chen
7,926,234 B2 4/2011 Pervan et al.
7,930,862 B2 4/2011 Bergelin et al.
7,958,689 B2 6/2011 Lei
7,980,043 B2 7/2011 Moebus
7,984,600 B2 7/2011 Alford et al.
8,006,460 B2 8/2011 Chen et al.
8,021,741 B2 9/2011 Chen et al.
8,028,486 B2 10/2011 Pervan et al.
8,029,880 B2 10/2011 Liu
8,042,311 B2 10/2011 Pervan et al.
8,071,193 B2 12/2011 Windmoeller
8,082,717 B2 12/2011 Dammers
8,112,891 B2 2/2012 Pervan
8,166,718 B2 5/2012 Liu
8,171,691 B1 5/2012 Stone
8,196,366 B2 6/2012 Thiers et al.
8,234,829 B2 8/2012 Thiers et al.
8,245,477 B2 8/2012 Pervan
8,245,478 B2 8/2012 Bergelin et al.
8,261,507 B2 9/2012 Hahn et al.
8,281,549 B2 10/2012 Du
8,293,058 B2 10/2012 Pervan et al.
8,353,140 B2 1/2013 Pervan et al.
8,356,452 B2 1/2013 Thiers et al.
8,365,499 B2 2/2013 Nilsson et al.
8,375,674 B2 2/2013 Braun et al.
8,381,488 B2 2/2013 Pervan
8,397,456 B2 3/2013 Ruhdorfer
8,419,877 B2 4/2013 Pervan et al.
8,480,841 B2 7/2013 Pervan et al.
8,484,924 B2 7/2013 Braun
8,490,361 B2 7/2013 Curry et al.
8,511,031 B2 8/2013 Bergelin et al.
8,544,231 B2 10/2013 Hannig
8,544,232 B2 10/2013 Wybo et al.
8,584,423 B2 11/2013 Pervan et al.
8,613,826 B2 12/2013 Pervan et al.
8,658,274 B2 2/2014 Chen et al.

(56) References Cited

U.S. PATENT DOCUMENTS

| | | | |
|---|---|---|---|
| 8,683,698 | B2 | 4/2014 | Pervan et al. |
| 8,720,151 | B2 | 5/2014 | Pervan |
| 8,726,604 | B2 | 5/2014 | Hannig |
| 8,756,899 | B2 | 6/2014 | Nilsson et al. |
| 8,784,587 | B2 | 7/2014 | Lindgren et al. |
| 8,800,150 | B2 | 8/2014 | Pervan |
| 8,828,175 | B2 | 9/2014 | Roy |
| 8,833,028 | B2 | 9/2014 | Whispell et al. |
| 8,834,992 | B2 | 9/2014 | Chen et al. |
| 8,839,584 | B2 | 9/2014 | Sokol |
| 8,850,769 | B2 | 10/2014 | Pervan |
| 8,875,464 | B2 | 11/2014 | Pervan et al. |
| 8,935,899 | B2 | 1/2015 | Bergelin et al. |
| 8,952,078 | B2 | 2/2015 | Gould |
| 9,140,010 | B2 | 9/2015 | Pervan |
| 9,194,135 | B2 | 11/2015 | Pervan |
| 9,222,267 | B2 | 12/2015 | Bergelin et al. |
| 9,249,581 | B2 | 2/2016 | Nilsson et al. |
| 9,296,191 | B2 | 3/2016 | Pervan et al. |
| 9,314,936 | B2 | 4/2016 | Pervan |
| 9,410,328 | B2 | 8/2016 | Pervan |
| 9,482,015 | B2 | 11/2016 | Pervan |
| 9,556,623 | B2 | 1/2017 | Pervan |
| 9,663,956 | B2 | 5/2017 | Pervan |
| 9,714,515 | B2 | 7/2017 | Pervan |
| 9,758,966 | B2 | 9/2017 | Bergelin et al. |
| 9,758,972 | B2 | 9/2017 | Pervan |
| 9,840,849 | B2 | 12/2017 | Pervan |
| 10,066,400 | B2 | 9/2018 | Pervan |
| 10,619,356 | B2 | 4/2020 | Pervan |
| 10,669,724 | B2 | 6/2020 | Pervan |
| 11,002,022 | B2 | 5/2021 | Pervan |
| 2001/0021431 | A1 | 9/2001 | Chen et al. |
| 2002/0007608 | A1 | 1/2002 | Pervan |
| 2002/0007609 | A1 | 1/2002 | Pervan |
| 2002/0023702 | A1 | 2/2002 | Kettler |
| 2002/0031646 | A1 | 3/2002 | Chen et al. |
| 2002/0046433 | A1 | 4/2002 | Sellman et al. |
| 2002/0056245 | A1 | 5/2002 | Thiers |
| 2002/0083673 | A1 | 7/2002 | Kettler et al. |
| 2002/0092263 | A1 | 7/2002 | Schulte |
| 2002/0095894 | A1 | 7/2002 | Pervan |
| 2002/0100231 | A1 | 8/2002 | Miller et al. |
| 2002/0112429 | A1 | 8/2002 | Niese et al. |
| 2002/0112433 | A1 | 8/2002 | Pervan |
| 2002/0142135 | A1 | 10/2002 | Chen et al. |
| 2002/0170257 | A1 | 11/2002 | McLain et al. |
| 2002/0170258 | A1 | 11/2002 | Schwitte et al. |
| 2002/0178674 | A1 | 12/2002 | Pervan |
| 2002/0178681 | A1 | 12/2002 | Zancai et al. |
| 2002/0178682 | A1 | 12/2002 | Pervan |
| 2002/0189183 | A1 | 12/2002 | Ricciardelli |
| 2003/0009971 | A1 | 1/2003 | Palmberg |
| 2003/0024199 | A1 | 2/2003 | Pervan et al. |
| 2003/0024200 | A1 | 2/2003 | Moriau et al. |
| 2003/0033777 | A1 | 2/2003 | Thiers et al. |
| 2003/0037504 | A1 | 2/2003 | Schwitte et al. |
| 2003/0101674 | A1 | 6/2003 | Pervan et al. |
| 2003/0101681 | A1 | 6/2003 | Tychsen |
| 2003/0110720 | A1 | 6/2003 | Berard et al. |
| 2003/0140478 | A1 | 7/2003 | Olofsson |
| 2003/0154676 | A1 | 8/2003 | Schwartz |
| 2003/0180091 | A1 | 9/2003 | Stridsman |
| 2003/0196397 | A1 | 10/2003 | Niese et al. |
| 2003/0196405 | A1 | 10/2003 | Pervan |
| 2003/0224147 | A1 | 12/2003 | Maine et al. |
| 2003/0233809 | A1 | 12/2003 | Pervan |
| 2004/0031227 | A1 | 2/2004 | Knauseder |
| 2004/0035078 | A1 | 2/2004 | Pervan |
| 2004/0060255 | A1 | 4/2004 | Knauseder |
| 2004/0068954 | A1 | 4/2004 | Martensson |
| 2004/0107659 | A1 | 6/2004 | Glockl |
| 2004/0139678 | A1 | 7/2004 | Pervan |
| 2004/0168392 | A1 | 9/2004 | Konzelmann et al. |
| 2004/0177584 | A1 | 9/2004 | Pervan |
| 2004/0182036 | A1 | 9/2004 | Sjoberg et al. |
| 2004/0206036 | A1 | 10/2004 | Pervan |
| 2004/0211143 | A1 | 10/2004 | Hanning |
| 2004/0211144 | A1 | 10/2004 | Stanchfield |
| 2004/0219339 | A1 | 11/2004 | Dempsey et al. |
| 2004/0226243 | A1 | 11/2004 | Lin et al. |
| 2004/0241374 | A1 | 12/2004 | Thiers et al. |
| 2004/0255538 | A1 | 12/2004 | Ruhdorfer |
| 2004/0255541 | A1 | 12/2004 | Thiers et al. |
| 2004/0261348 | A1 | 12/2004 | Vulin |
| 2005/0003160 | A1 | 1/2005 | Chen et al. |
| 2005/0005558 | A1 | 1/2005 | Bolduc |
| 2005/0055943 | A1 | 3/2005 | Pervan |
| 2005/0069674 | A1 | 3/2005 | Chang |
| 2005/0102937 | A1 | 5/2005 | Pervan |
| 2005/0108969 | A1 | 5/2005 | Whitaker |
| 2005/0138881 | A1 | 6/2005 | Pervan |
| 2005/0166502 | A1 | 8/2005 | Pervan et al. |
| 2005/0166514 | A1 | 8/2005 | Pervan |
| 2005/0166516 | A1 | 8/2005 | Pervan |
| 2005/0176321 | A1 | 8/2005 | Crette et al. |
| 2005/0193677 | A1 | 9/2005 | Vogel |
| 2005/0208255 | A1 | 9/2005 | Pervan |
| 2005/0210810 | A1 | 9/2005 | Pervan |
| 2005/0235593 | A1 | 10/2005 | Hecht |
| 2005/0250921 | A1 | 11/2005 | Qiu et al. |
| 2005/0252130 | A1 | 11/2005 | Martensson |
| 2005/0268570 | A2 | 12/2005 | Pervan |
| 2005/0268571 | A1 | 12/2005 | Magnusson |
| 2006/0032168 | A1 | 2/2006 | Thiers et al. |
| 2006/0032175 | A1 | 2/2006 | Chen et al. |
| 2006/0048474 | A1 | 3/2006 | Pervan et al. |
| 2006/0070333 | A1 | 4/2006 | Pervan |
| 2006/0075713 | A1 | 4/2006 | Pervan et al. |
| 2006/0099386 | A1 | 5/2006 | Smith |
| 2006/0101769 | A1 | 5/2006 | Pervan et al. |
| 2006/0144004 | A1 | 7/2006 | Nollet et al. |
| 2006/0154015 | A1 | 7/2006 | Miller et al. |
| 2006/0156666 | A1 | 7/2006 | Caufield |
| 2006/0179773 | A1 | 8/2006 | Pervan |
| 2006/0191226 | A1 | 8/2006 | Kim et al. |
| 2006/0194015 | A1 | 8/2006 | Sabater et al. |
| 2006/0196139 | A1 | 9/2006 | Pervan et al. |
| 2006/0225377 | A1 | 10/2006 | Moriau et al. |
| 2006/0248830 | A1 | 11/2006 | Gustaaf et al. |
| 2006/0248831 | A1 | 11/2006 | Moriau et al. |
| 2006/0260254 | A1 | 11/2006 | Pervan |
| 2006/0283127 | A1 | 12/2006 | Pervan |
| 2007/0006543 | A1 | 1/2007 | Engstrom |
| 2007/0011981 | A1 | 1/2007 | Eisermann |
| 2007/0022694 | A1 | 2/2007 | Chen et al. |
| 2007/0028547 | A1 | 2/2007 | Grafenauer et al. |
| 2007/0094986 | A1 | 5/2007 | Moriau et al. |
| 2007/0094987 | A1 | 5/2007 | Moriau et al. |
| 2007/0151189 | A1 | 7/2007 | Yang |
| 2007/0151191 | A1 | 7/2007 | August |
| 2007/0154840 | A1 | 7/2007 | Thies et al. |
| 2007/0166516 | A1 | 7/2007 | Kim et al. |
| 2007/0175143 | A1 | 8/2007 | Pervan et al. |
| 2007/0175144 | A1 | 8/2007 | Hakansson |
| 2007/0175148 | A1 | 8/2007 | Bergelin et al. |
| 2007/0175156 | A1 | 8/2007 | Pervan et al. |
| 2007/0193178 | A1 | 8/2007 | Groeke et al. |
| 2007/0193180 | A1 | 8/2007 | Plante |
| 2007/0196624 | A1 | 8/2007 | Chen et al. |
| 2007/0218252 | A1 | 9/2007 | Donald |
| 2007/0292656 | A1 | 12/2007 | Handojo |
| 2008/0000179 | A1 | 1/2008 | Pervan et al. |
| 2008/0000180 | A1 | 1/2008 | Pervan |
| 2008/0000182 | A1 | 1/2008 | Pervan |
| 2008/0000183 | A1 | 1/2008 | Bergelin et al. |
| 2008/0000186 | A1 | 1/2008 | Pervan et al. |
| 2008/0000187 | A1 | 1/2008 | Pervan |
| 2008/0000188 | A1 | 1/2008 | Pervan |
| 2008/0000189 | A1 | 1/2008 | Pervan et al. |
| 2008/0000194 | A1 | 1/2008 | Pervan et al. |
| 2008/0000417 | A1 | 1/2008 | Pervan et al. |
| 2008/0005989 | A1 | 1/2008 | Pervan et al. |
| 2008/0005992 | A1 | 1/2008 | Pervan |

(56) References Cited

U.S. PATENT DOCUMENTS

| | | | | |
|---|---|---|---|---|
| 2008/0005997 | A1 | 1/2008 | Pervan | |
| 2008/0005998 | A1 | 1/2008 | Pervan | |
| 2008/0005999 | A1 | 1/2008 | Pervan | |
| 2008/0008871 | A1 | 1/2008 | Pervan | |
| 2008/0010931 | A1 | 1/2008 | Pervan et al. | |
| 2008/0010937 | A1 | 1/2008 | Pervan et al. | |
| 2008/0028707 | A1 | 2/2008 | Pervan | |
| 2008/0028713 | A1 | 2/2008 | Pervan et al. | |
| 2008/0029490 | A1 | 2/2008 | Martin et al. | |
| 2008/0034701 | A1 | 2/2008 | Pervan | |
| 2008/0034708 | A1 | 2/2008 | Pervan | |
| 2008/0041007 | A1 | 2/2008 | Pervan et al. | |
| 2008/0041008 | A1 | 2/2008 | Pervan | |
| 2008/0053028 | A1 | 3/2008 | Moriau et al. | |
| 2008/0060308 | A1 | 3/2008 | Pervan | |
| 2008/0060309 | A1 | 3/2008 | Moriau et al. | |
| 2008/0060310 | A1 | 3/2008 | Moriau et al. | |
| 2008/0066415 | A1 | 3/2008 | Pervan et al. | |
| 2008/0092473 | A1 | 4/2008 | Heyns | |
| 2008/0104921 | A1 | 5/2008 | Pervan et al. | |
| 2008/0110125 | A1 | 5/2008 | Pervan | |
| 2008/0121544 | A1 | 5/2008 | Hagihara et al. | |
| 2008/0134607 | A1 | 6/2008 | Pervan et al. | |
| 2008/0134613 | A1 | 6/2008 | Pervan | |
| 2008/0134614 | A1 | 6/2008 | Pervan et al. | |
| 2008/0138560 | A1 | 6/2008 | Windmoller | |
| 2008/0148674 | A1 | 6/2008 | Thiers et al. | |
| 2008/0153609 | A1 | 6/2008 | Kotler | |
| 2008/0172971 | A1 | 7/2008 | Pervan | |
| 2008/0184647 | A1 | 8/2008 | Yau | |
| 2008/0241440 | A1 | 10/2008 | Bauer | |
| 2008/0256890 | A1 | 10/2008 | Pervan et al. | |
| 2008/0263975 | A1 | 10/2008 | Mead | |
| 2008/0311355 | A1 | 12/2008 | Chen et al. | |
| 2009/0031662 | A1 | 2/2009 | Chen et al. | |
| 2009/0038253 | A1 | 2/2009 | Martensson | |
| 2009/0049787 | A1 | 2/2009 | Hannig | |
| 2009/0110888 | A1 | 4/2009 | Wuest et al. | |
| 2009/0133353 | A1 | 5/2009 | Pervan et al. | |
| 2009/0151290 | A1 | 6/2009 | Liu | |
| 2009/0155612 | A1 | 6/2009 | Pervan et al. | |
| 2009/0159156 | A1 | 6/2009 | Walker | |
| 2009/0183458 | A1 | 7/2009 | Gibson et al. | |
| 2009/0186710 | A1 | 7/2009 | Joseph | |
| 2009/0193748 | A1 | 8/2009 | Boo et al. | |
| 2009/0223162 | A1 | 9/2009 | Chen et al. | |
| 2009/0226662 | A1 | 9/2009 | Dyczko-Riglin et al. | |
| 2009/0235604 | A1 | 9/2009 | Cheng et al. | |
| 2009/0249733 | A1 | 10/2009 | Moebus | |
| 2009/0269522 | A1 | 10/2009 | Liu | |
| 2009/0272058 | A1 | 11/2009 | Duselis et al. | |
| 2010/0011695 | A1 | 1/2010 | Cheng et al. | |
| 2010/0088990 | A1 | 4/2010 | Liu | |
| 2010/0129611 | A1 | 5/2010 | Sugimoto | |
| 2010/0154343 | A1 | 6/2010 | Dammers | |
| 2010/0242398 | A1 | 9/2010 | Cullen | |
| 2010/0251640 | A1* | 10/2010 | Franchini ................ | E04F 15/02 52/177 |
| 2010/0260962 | A1 | 10/2010 | Chen et al. | |
| 2010/0300030 | A1 | 12/2010 | Pervan et al. | |
| 2010/0319293 | A1 | 12/2010 | Dammers | |
| 2011/0001420 | A1 | 1/2011 | Tchakarov et al. | |
| 2011/0030303 | A1 | 2/2011 | Pervan et al. | |
| 2011/0041996 | A1 | 2/2011 | Pervan | |
| 2011/0056167 | A1 | 3/2011 | Nilsson | |
| 2011/0131901 | A1 | 6/2011 | Pervan et al. | |
| 2011/0131909 | A1 | 6/2011 | Hannig | |
| 2011/0138722 | A1 | 6/2011 | Hannig | |
| 2011/0146177 | A1 | 6/2011 | Hannig | |
| 2011/0154665 | A1 | 6/2011 | Pervan et al. | |
| 2011/0154763 | A1 | 6/2011 | Bergelin et al. | |
| 2011/0167744 | A1 | 7/2011 | Whispell et al. | |
| 2011/0247285 | A1 | 10/2011 | Wybo et al. | |
| 2011/0247748 | A1 | 10/2011 | Pervan et al. | |
| 2011/0296780 | A1 | 12/2011 | Windmoeller | |
| 2011/0308097 | A1 | 12/2011 | Vollrath | |
| 2012/0003439 | A1 | 1/2012 | Chen et al. | |
| 2012/0040149 | A1 | 2/2012 | Chen et al. | |
| 2012/0124932 | A1 | 5/2012 | Schulte et al. | |
| 2012/0137617 | A1 | 6/2012 | Pervan | |
| 2012/0216472 | A1 | 8/2012 | Martensson et al. | |
| 2012/0266555 | A1 | 10/2012 | Cappelle | |
| 2012/0276369 | A1 | 11/2012 | Jing et al. | |
| 2012/0279154 | A1 | 11/2012 | Bergelin et al. | |
| 2012/0279158 | A1 | 11/2012 | Konstanczak | |
| 2013/0014890 | A1 | 1/2013 | Pervan et al. | |
| 2013/0042563 | A1 | 2/2013 | Pervan et al. | |
| 2013/0047536 | A1 | 2/2013 | Pervan | |
| 2013/0065072 | A1 | 3/2013 | Pervan et al. | |
| 2013/0111758 | A1 | 5/2013 | Nilsson et al. | |
| 2013/0145707 | A1 | 6/2013 | Pervan | |
| 2013/0199120 | A1 | 8/2013 | Bergelin et al. | |
| 2013/0260089 | A1 | 10/2013 | Gorby et al. | |
| 2013/0269863 | A1 | 10/2013 | Pervan et al. | |
| 2013/0273244 | A1 | 10/2013 | Vetter et al. | |
| 2013/0283720 | A1 | 10/2013 | Pervan et al. | |
| 2013/0298487 | A1 | 11/2013 | Bergelin et al. | |
| 2013/0305649 | A1 | 11/2013 | Thiers | |
| 2014/0000197 | A1 | 1/2014 | Pervan | |
| 2014/0033635 | A1 | 2/2014 | Pervan et al. | |
| 2014/0069044 | A1 | 3/2014 | Wallin | |
| 2014/0115994 | A1 | 5/2014 | Pervan et al. | |
| 2014/0215952 | A1 | 8/2014 | Pervan | |
| 2014/0237924 | A1 | 8/2014 | Nilsson et al. | |
| 2014/0283466 | A1 | 9/2014 | Boo | |
| 2014/0318061 | A1 | 10/2014 | Pervan | |
| 2014/0352248 | A1 | 12/2014 | Whispell et al. | |
| 2014/0356594 | A1 | 12/2014 | Chen et al. | |
| 2015/0013260 | A1 | 1/2015 | Pervan | |
| 2015/0059927 | A1 | 3/2015 | Brnnstrm et al. | |
| 2015/0090400 | A1 | 4/2015 | Bergelin et al. | |
| 2015/0225964 | A1 | 8/2015 | Chen et al. | |
| 2015/0345153 | A1 | 12/2015 | Pervan | |
| 2016/0016390 | A1 | 1/2016 | Lundblad et al. | |
| 2016/0016391 | A1 | 1/2016 | Lundblad et al. | |
| 2016/0034091 | A1 | 2/2016 | Cheng et al. | |
| 2016/0052245 | A1 | 2/2016 | Chen et al. | |
| 2016/0069089 | A1 | 3/2016 | Bergelin et al. | |
| 2016/0108624 | A1 | 4/2016 | Nilsson et al. | |
| 2016/0168865 | A1 | 6/2016 | Pervan | |
| 2016/0186318 | A1 | 6/2016 | Pervan et al. | |
| 2016/0194883 | A1 | 7/2016 | Pervan | |
| 2016/0194885 | A1 | 7/2016 | Whispell et al. | |
| 2016/0201324 | A1 | 7/2016 | Hkansson et al. | |
| 2016/0208501 | A1 | 7/2016 | Pervan | |
| 2016/0250835 | A1 | 9/2016 | Pervan | |
| 2016/0265234 | A1 | 9/2016 | Pervan | |
| 2016/0265236 | A1 | 9/2016 | Pervan | |
| 2016/0303868 | A1 | 10/2016 | Hansson et al. | |
| 2016/0340910 | A1 | 11/2016 | Ramachandra et al. | |
| 2017/0037642 | A1 | 2/2017 | Boo | |
| 2017/0037645 | A1 | 2/2017 | Pervan | |
| 2017/0114550 | A1 | 4/2017 | Pervan | |
| 2017/0268238 | A1 | 9/2017 | Pervan | |
| 2018/0080232 | A1 | 3/2018 | Pervan | |
| 2018/0223540 | A1 | 8/2018 | Cappelle | |
| 2018/0313094 | A1 | 11/2018 | Pervan | |
| 2018/0355260 | A1 | 12/2018 | Castillo et al. | |
| 2018/0355620 | A1 | 12/2018 | Pervan | |
| 2020/0208411 | A1 | 7/2020 | Pervan | |
| 2020/0282589 | A1 | 9/2020 | Josefsson et al. | |
| 2020/0308846 | A1 | 10/2020 | Josefsson et al. | |
| 2021/0198901 | A1 | 7/2021 | Josefsson et al. | |
| 2021/0363760 | A1 | 11/2021 | Pervan | |
| 2022/0063167 | A1 | 3/2022 | Josefsson et al. | |

FOREIGN PATENT DOCUMENTS

| | | | |
|---|---|---|---|
| CA | 2903432 | A1 | 1/2008 |
| CN | 2076142 | U | 5/1991 |
| CN | 2106197 | U | 6/1992 |
| CN | 2124276 | U | 12/1992 |
| CN | 1270263 | A | 10/2000 |
| CN | 1396978 | A | 2/2003 |

(56) References Cited

FOREIGN PATENT DOCUMENTS

| | | | |
|---|---|---|---|
| CN | 1439789 | A | 9/2003 |
| CN | 2573602 | Y | 9/2003 |
| CN | 1177983 | C | 12/2004 |
| CN | 2673990 | Y | 1/2005 |
| CN | 2866694 | Y | 2/2007 |
| CN | 101044289 | A | 9/2007 |
| CN | 100547206 | C | 10/2009 |
| CN | 101932780 | A | 12/2010 |
| CN | 202055464 | U | 11/2011 |
| DE | 1081653 | B | 5/1960 |
| DE | 2251762 | A1 | 5/1974 |
| DE | 2832817 | A1 | 2/1980 |
| DE | 2921221 | A1 | 12/1980 |
| DE | 3904686 | C1 | 8/1989 |
| DE | 4020682 | A1 | 1/1992 |
| DE | 4242530 | A1 | 6/1994 |
| DE | 29517995 | U1 | 2/1996 |
| DE | 29521221 | U1 | 3/1997 |
| DE | 19854475 | A1 | 7/1999 |
| DE | 20002744 | U1 | 8/2000 |
| DE | 20018817 | U1 | 1/2001 |
| DE | 10001248 | A1 | 7/2001 |
| DE | 10032204 | C1 | 7/2001 |
| DE | 10006748 | A1 | 8/2001 |
| DE | 10049172 | A1 | 4/2002 |
| DE | 20206460 | U1 | 7/2002 |
| DE | 20207844 | U1 | 8/2002 |
| DE | 10300451 | B3 | 1/2004 |
| DE | 10316695 | A1 | 10/2004 |
| DE | 102005061099 | A1 | 3/2007 |
| DE | 102006024184 | A1 | 11/2007 |
| DE | 102006058655 | A1 | 6/2008 |
| DE | 102007020271 | A1 | 8/2008 |
| DE | 202008011589 | U1 | 11/2008 |
| DE | 202008012001 | U1 | 11/2008 |
| DE | 102007032885 | A1 | 1/2009 |
| EP | 0665347 | A1 | 8/1995 |
| EP | 0903451 | A2 | 3/1999 |
| EP | 1045083 | A1 | 10/2000 |
| EP | 1061201 | A2 | 12/2000 |
| EP | 1165906 | A1 | 1/2002 |
| EP | 1262609 | A1 | 12/2002 |
| EP | 1350904 | A2 | 10/2003 |
| EP | 1357239 | A2 | 10/2003 |
| EP | 1362947 | A2 | 11/2003 |
| EP | 1938963 | A1 | 7/2008 |
| EP | 2206851 | A2 | 7/2010 |
| EP | 2267239 | A2 | 12/2010 |
| EP | 2339092 | A1 | 6/2011 |
| EP | 2395180 | A2 | 12/2011 |
| EP | 2189591 | A3 | 3/2012 |
| EP | 2516768 | A2 | 10/2012 |
| EP | 3091141 | A1 | 11/2016 |
| EP | 2520737 | B1 | 3/2017 |
| ES | 2350229 | T3 | 1/2011 |
| ES | 2350339 | A1 | 1/2011 |
| FI | 21805 | A | 1/1947 |
| FR | 2810060 | A1 | 12/2001 |
| GB | 0519198 | A | 3/1940 |
| GB | 1308011 | A | 2/1973 |
| GB | 1430423 | A | 3/1976 |
| GB | 1520964 | A | 8/1978 |
| GB | 2020998 | A | 11/1979 |
| GB | 2117813 | A | 10/1983 |
| GB | 2243381 | A | 10/1991 |
| GB | 2256023 | A | 11/1992 |
| JP | 56-009114 | A | 1/1981 |
| JP | 56-104936 | U | 8/1981 |
| JP | 56-131752 | A | 10/1981 |
| JP | 57-157636 | U | 10/1982 |
| JP | 59-185346 | U | 12/1984 |
| JP | 60-255843 | A | 12/1985 |
| JP | 62-178654 | A | 8/1987 |
| JP | 01-178659 | A | 7/1989 |
| JP | 01-202403 | A | 8/1989 |

| | | | |
|---|---|---|---|
| JP | 01-033702 | Y2 | 10/1989 |
| JP | 03-047366 | A | 2/1991 |
| JP | 03-055444 | U | 5/1991 |
| JP | 04-134337 | U | 12/1992 |
| JP | 05-096282 | U | 12/1993 |
| JP | 05-318674 | A | 12/1993 |
| JP | 06-010487 | U | 2/1994 |
| JP | 06-039840 | B2 | 5/1994 |
| JP | 06-158831 | A | 6/1994 |
| JP | 07-026467 | U | 5/1995 |
| JP | 07-180333 | A | 7/1995 |
| JP | 08-028015 | A | 1/1996 |
| JP | 08-086080 | A | 4/1996 |
| JP | 08-109734 | A | 4/1996 |
| JP | 09-038906 | A | 2/1997 |
| JP | 09-053319 | A | 2/1997 |
| JP | 10-002096 | A | 1/1998 |
| JP | 10-219975 | A | 8/1998 |
| JP | 10-229231 | A | 8/1998 |
| JP | 10-299231 | A | 11/1998 |
| JP | 11-131771 | A | 5/1999 |
| JP | 11-268010 | A | 10/1999 |
| JP | 11-324292 | A | 11/1999 |
| JP | 2000-265652 | A | 9/2000 |
| JP | 2002-011708 | A | 1/2002 |
| JP | 3363976 | B2 | 1/2003 |
| JP | 2003-307023 | A | 10/2003 |
| JP | 3538538 | B2 | 6/2004 |
| JP | 2004-225387 | A | 8/2004 |
| JP | 2006-118337 | A | 5/2006 |
| JP | 2011-511891 | A | 4/2011 |
| JP | 6480491 | B2 | 3/2019 |
| KR | 20-1996-0005785 | | 7/1996 |
| KR | 10-2002-0082018 | A | 10/2002 |
| KR | 10-2007-0000322 | A | 1/2007 |
| RU | 2255189 | C2 | 6/2005 |
| RU | 2359093 | C2 | 6/2009 |
| SE | 506254 | C2 | 11/1997 |
| SE | 000785 | L | 9/2001 |
| SE | 0103130 | L | 3/2003 |
| WO | 89/03753 | A1 | 5/1989 |
| WO | 90/06232 | A1 | 6/1990 |
| WO | 94/01628 | A2 | 1/1994 |
| WO | 94/26999 | A1 | 11/1994 |
| WO | 96/06248 | A1 | 2/1996 |
| WO | 96/27721 | A1 | 9/1996 |
| WO | 97/47834 | A1 | 12/1997 |
| WO | 98/38401 | A1 | 9/1998 |
| WO | 98/58142 | A1 | 12/1998 |
| WO | 99/00242 | A1 | 1/1999 |
| WO | 99/17930 | A1 | 4/1999 |
| WO | 99/58254 | A1 | 11/1999 |
| WO | 99/66151 | A1 | 12/1999 |
| WO | 99/66152 | A1 | 12/1999 |
| WO | 00/17467 | A1 | 3/2000 |
| WO | 00/22225 | A1 | 4/2000 |
| WO | 00/47841 | A1 | 8/2000 |
| WO | 00/66856 | A1 | 11/2000 |
| WO | 01/02669 | A1 | 1/2001 |
| WO | 01/02670 | A1 | 1/2001 |
| WO | 01/02671 | A1 | 1/2001 |
| WO | 01/44669 | A2 | 6/2001 |
| WO | 01/47726 | A1 | 7/2001 |
| WO | 01/48331 | A1 | 7/2001 |
| WO | 01/48332 | A1 | 7/2001 |
| WO | 01/48333 | A1 | 7/2001 |
| WO | 01/51732 | A1 | 7/2001 |
| WO | 01/51733 | A1 | 7/2001 |
| WO | 01/53628 | A1 | 7/2001 |
| WO | 01/54897 | A1 | 8/2001 |
| WO | 01/66877 | A1 | 9/2001 |
| WO | 01/75247 | A1 | 10/2001 |
| WO | 01/77461 | A1 | 10/2001 |
| WO | 01/88306 | A1 | 11/2001 |
| WO | 01/98604 | A1 | 12/2001 |
| WO | 02/55809 | A1 | 7/2002 |
| WO | 02/55810 | A1 | 7/2002 |
| WO | 02/60691 | A1 | 8/2002 |
| WO | 02/92342 | A1 | 11/2002 |

(56) References Cited

FOREIGN PATENT DOCUMENTS

| | | | |
|---|---|---|---|
| WO | 2002/103135 | A1 | 12/2002 |
| WO | 03/12224 | A1 | 2/2003 |
| WO | 03/16654 | A1 | 2/2003 |
| WO | 03/25307 | A1 | 3/2003 |
| WO | 03/35396 | A1 | 5/2003 |
| WO | 03/44303 | A1 | 5/2003 |
| WO | 03/78761 | A1 | 9/2003 |
| WO | 03/83234 | A1 | 10/2003 |
| WO | 03/87498 | A1 | 10/2003 |
| WO | 03/89736 | A1 | 10/2003 |
| WO | 2004/005648 | A1 | 1/2004 |
| WO | 2004/011740 | A2 | 2/2004 |
| WO | 2004/016877 | A1 | 2/2004 |
| WO | 2004/052357 | A1 | 6/2004 |
| WO | 2004/053257 | A1 | 6/2004 |
| WO | 2004/085765 | A1 | 10/2004 |
| WO | 2005/068747 | A1 | 7/2005 |
| WO | 2006/032378 | A1 | 3/2006 |
| WO | 2006/043893 | A1 | 4/2006 |
| WO | 2006/131160 | A1 | 12/2006 |
| WO | 2006/133690 | A1 | 12/2006 |
| WO | 2007/015669 | A2 | 2/2007 |
| WO | 2007/020088 | A1 | 2/2007 |
| WO | 2007/081267 | A1 | 7/2007 |
| WO | 2007/118352 | A1 | 10/2007 |
| WO | 2008/008824 | A1 | 1/2008 |
| WO | 2008/133377 | A1 | 11/2008 |
| WO | 2008/142538 | A2 | 11/2008 |
| WO | 2009/061279 | A1 | 5/2009 |
| WO | 2009/065769 | A2 | 5/2009 |
| WO | 2009/071822 | A2 | 6/2009 |
| WO | 2009/116926 | A1 | 9/2009 |
| WO | 2009/132235 | A2 | 10/2009 |
| WO | 2010/015516 | A2 | 2/2010 |
| WO | 2010/023042 | A1 | 3/2010 |
| WO | 2010/028901 | A1 | 3/2010 |
| WO | 2010/072357 | A2 | 7/2010 |
| WO | 2010/081532 | A1 | 7/2010 |
| WO | 2011/012104 | A2 | 2/2011 |
| WO | 2011/028171 | A1 | 3/2011 |
| WO | 2011/077311 | A2 | 6/2011 |
| WO | 2013/026559 | A2 | 2/2013 |
| WO | 2013/126900 | A2 | 8/2013 |
| WO | 2014/007738 | A1 | 1/2014 |
| WO | 2021/018918 | A1 | 2/2021 |

OTHER PUBLICATIONS

Decision to grant received for European Patent Application No. 16171860, mailed on Oct. 17, 2019, 2 pages.
Decision to Grant received for Japanese Patent Application No. 2014-528327, mailed on Jan. 31, 2017, 5 pages (2 pages of English Translation and 3 pages of Original Document).
Decision to Grant received for Japanese Patent Application No. 2017-038763, mailed on Jan. 11, 2019, 5 pages (2 pages of English Translation and 3 pages of Original Document).
Decision to Grant received for Japanese Patent Application No. 2019-019847, mailed on Oct. 2, 2020, 5 pages (2 pages of English Translation and 3 pages of Original Document).
European Search Report and Search Opinion received for EP Application No. 12826931, mailed on Apr. 29, 2016, 7 pages.
European Search Report and Search Opinion received for European Application No. 16171860, mailed on Dec. 12, 2016, 8 pages.
European Search Report and Search Opinion received for European Application No. 19173607, mailed on Sep. 12, 2019, 7 pages.
Extended European Search Report dated Apr. 19, 2016 in EP 12 82 4331.8, European Patent Office, Munich, DE, 7 pages.
Intention to grant received for European Application No. 12826931, mailed on Jan. 9, 2019, 6 pages.
Intention to grant received for European Patent Application No. 16171860, mailed on Jun. 12, 2019, 6 pages.
Intention to grant received for European Patent Application No. 19173607, mailed on Mar. 31, 2023, 6 pages.
International Search Report issued in PCT/SE2012/050911, dated Dec. 13, 2012, Patent-och registreringsverket, Stockholm, SE, 8 pages.
Notice of Allowance received for Korean Patent Application No. 10-2019-7035340, mailed on Oct. 28, 2020, 4 pages (2 pages of English Translation and 2 pages of Original Document).
Notice of Allowance received for Korean Patent Application No. 10-2014-7006788, mailed on Aug. 29, 2019, 3 pages (2 pages of English Translation and 1 page of Original Document).
Office Action received for Chinese Patent Application No. 201280040945, mailed on Jul. 29, 2015, 15 pages (7 pages of English Translation and 8 pages of Original Document).
Office Action received for Chinese Patent Application No. 201710941552, mailed on Apr. 24, 2019, 14 pages (6 pages of English Translation and 8 pages of Original Document).
Office Action received for Chinese Patent Application No. 202011541441, mailed on Nov. 24, 2021, 12 pages (6 pages of English Translation and 6 pages of Original Document).
Office Action received for European Application No. 12826931, mailed on Apr. 19, 2018, 5 pages.
Office Action received for European Application No. 16171860, mailed on Oct. 8, 2018, 6 pages.
Office Action received for European Application No. 19173607, mailed on Oct. 25, 2021, 5 pages.
Office Action received for Japanese Patent Application No. 2014-528327, mailed on May 13, 2016, 7 pages (4 pages of English Translation and 3 pages of Original Document).
Office Action received for Japanese Patent Application No. 2017-038763, mailed on Mar. 30, 2018, 9 pages (5 pages of English Translation and 4 pages of Original Document).
Office Action received for Japanese Patent Application No. 2019-019847, mailed on Feb. 28, 2020, 12 pages (6 pages of English Translation and 6 pages of Original Document).
Office Action received for Japanese Patent Application No. 2020-193496, mailed on May 6, 2022, 2 pages (1 pages of English Translation and 1 pages of Original Document).
Office Action received for Japanese Patent Application No. 2020-193496, mailed on Nov. 16, 2021, 12 pages (6 pages of English Translation and 6 pages of Original Document).
Office Action received for Korean Patent Application No. 10-2014-7006788, mailed on Apr. 19, 2019, 14 pages (8 pages of English Translation and 6 pages of Original Document).
Office Action received for Korean Patent Application No. 10-2019-7035340, mailed on Jan. 29, 2020, 15 pages (8 pages of English Translation and 7 pages of Original Document).
Pervan, Darko (Author), Technical Disclosure entitled "VA073a Zip Loc," IP com No. IPCOM000210869D, Sep. 13, 2011, IP.com Prior Art Database, 36 pages.
The Fourth Office Action received for Chinese Patent Application No. 201710941552, mailed on Feb. 22, 2021, 12 pages (7 pages of English Translation and 5 pages of Original Document).
The Second Office Action received for Chinese Patent Application No. 201280040945, mailed on Mar. 8, 2016, 16 pages (10 pages of English Translation and 6 pages of Original Document).
The Second Office Action received for Chinese Patent Application No. 201710941552, mailed on Feb. 27, 2020, 17 pages (9 pages of English Translation and 8 pages of Original Document).
The Third Office Action received for Chinese Patent Application No. 201280040945, mailed on Aug. 9, 2016, 18 pages (11 pages of English Translation and 7 pages of Original Document).
The Third Office Action received for Chinese Patent Application No. 201710941552, mailed on Oct. 10, 2020, 7 pages (4 pages of English Translation and 3 pages of Original Document).
Intention to grant received for European Application No. 19173607, mailed on Oct. 23, 2023, 6 pages.
International Preliminary Report on Patentability received for PCT Patent Application No. PCT/SE2012/050911, mailed on Mar. 13, 2014, 11 pages.
U.S. Appl. No. 17/463,902, Per Josefsson, filed Sep. 1, 2021.
U.S. Appl. No. 17/705,465, Per Josefsson, filed Mar. 28, 2022.
U.S. Appl. No. 17/812,281, Per Josefsson, filed Jul. 13, 2022.

(56) References Cited

OTHER PUBLICATIONS

U.S. Appl. No. 17/831,826, Per Josefsson, filed Jun. 3, 2022.
U.S. Appl. No. 18/055,473, Per Josefsson, filed Nov. 15, 2022.
U.S. Appl. No. 18/209,359, Per Josefsson, filed Jun. 13, 2023.
U.S. Appl. No. 18/209,667, Per Josefsson, filed Jun. 14, 2023.
U.S. Appl. No. 18/210,429, Per Josefsson, filed Jun. 15, 2023.
U.S. Appl. No. 18/240,192, Darko Pervan, filed Aug. 30, 2023.
U.S. Appl. No. 18/495,918, Per Josefsson, filed Oct. 27, 2023.
U.S. Appl. No. 18/425,012, Per Josefsson, filed Jan. 29, 2024.
U.S. Appl. No. 18/628,988, Per Josefsson, filed Apr. 8, 2024.
U.S. Appl. No. 18/663,063, Per Josefsson, filed May 14, 2024.
Extended European Search Report and Search Opinion received for EP Application No. 24169058.5, mailed on Jul. 17, 2024, 10 pages.

* cited by examiner

KNOWN TECHNOLOGY

MECHANICAL LOCKING SYSTEM FOR FLOOR PANELS

RELATED APPLICATIONS

The present application is a continuation of U.S. application Ser. No. 16/854,343, filed on Apr. 21, 2020, which is a continuation of U.S. application Ser. No. 16/027,711, filed on Jul. 5, 2018, now U.S. Pat. No. 10,669,724, which is a continuation of U.S. application Ser. No. 15/614,962, filed on Jun. 6, 2017, now U.S. Pat. No. 10,066,400, which is a continuation of U.S. application Ser. No. 15/164,291, filed on May 25, 2016, now U.S. Pat. No. 9,758,972, which is a continuation of U.S. application Ser. No. 15/067,999, filed on Mar. 11, 2016, now U.S. Pat. No. 9,714,515, which is a continuation of U.S. application Ser. No. 13/596,988, filed on Aug. 28, 2012, now U.S. Pat. No. 9,314,936, and which claims the priority of Swedish Application No. 1150778-7, filed on Aug. 29, 2011 and Swedish Application No. 1150803-3, filed on Sep. 6, 2011. The entire contents of each of U.S. application Ser. Nos. 16/854,343, 16/027,711, 15/614,962, 15/164,291, 15/067,999, 13/596,988, and Swedish Application Nos. 1150778-7 and 1150803-3 are incorporated herein by reference.

TECHNICAL FIELD

The disclosure generally relates to the field of mechanical locking systems for floor panels and building panels. The disclosure shows floorboards, locking systems and production methods.

FIELD OF APPLICATION

Embodiments of the present disclosure are particularly suitable for use in floating floors, which are formed of floor panels which are joined mechanically with a locking system integrated with the floor panel, i.e. mounted at the factory, are made up of one or more upper layers of wood or wood veneer, decorative laminate, powder based surfaces or decorative plastic material, an intermediate core of wood-fibre-based material or plastic material and preferably a lower balancing layer on the rear side of the core. Floor panels with a surface layer of cork, linoleum, rubber or soft wear layers, for instance needle felt glued to a board, printed and preferably also varnished surface are included. Embodiments of the disclosure may also be used for joining building panels which preferably contain a board material for instance wall panels, ceilings, furniture components and similar.

The following description of known technique, problems of known systems and objects and features of embodiments of the disclosure will, as a non-restrictive example, be aimed above all at floor panels and especially thin floor panels such a luxury vinyl tiles, generally referred to as LVT, with long and shorts edges intended to be mechanically joined to each other on both long and short edges.

The long and short edges are mainly used to simplify the description of embodiments of the disclosure. The panels may be square.

BACKGROUND

As shown in FIGS. 1*a* and 1*b* LVT flooring usually comprise a transparent wear layer 3 which may be coated by a PU lacquer 2, preferably UV cured, a decorative plastic foil 4 and one or several core layers 5*a*, 5*b* which generally are of different density and hardness. Relevant parts of this known description are also a part of the disclosure.

Thin LVT floors with a thickness of 2-3 mm have traditionally been installed by gluing to the sub floor. Recently LVT floors have been introduced on the market that comprises a mechanical locking system, which allows a floating installation without glue. This facilitates installation and eliminates a lot of work to prepare the sub floor for gluing.

Such LVT floors have generally a thickness of 4-5 mm. This thickness is mainly required in order to form the locking system. The panel itself is strong and flexible and a thickness of about 3 mm would in many applications be sufficient but may not be suitable since it's difficult to form a locking system in such thin floors.

Floating LVT floors of this type have however several disadvantages. They are heavy. The density is for example about 1.6 kg/dm3 compared to about 0.8 kg/dm3 for laminate floors. The temperature sensitivity is more than three times higher than for laminate floors. An LVT floor may move about 2 mm/M when the temperature is changing 20 degrees Celsius.

Such problems related to thickness are also applicable in other high quality floor panels such as wood powder based floors with high density and quality. The additional cost of forming a locking system is considerable since the material content of the whole floor panel has to be increased with 25% or more.

Definition of Some Terms

In the following text, the visible surface of the installed floor panel is called "front side", while the opposite side of the floor panel, facing the sub floor, is called "rear side". The edge between the front and rear side is called "joint edge". By "horizontal plane" is meant a plane, which extends parallel to the outer part of the surface layer. Immediately juxta-posed upper parts of two adjacent joint edges of two joined floor panels together define a "vertical plane" perpendicular to the horizontal plane. By "vertical locking" is meant locking parallel to the vertical plane. By "horizontal locking" is meant locking parallel to the horizontal plane.

By "up" is meant towards the front side, by "down" towards the rear side, by "inwardly" mainly horizontally towards an inner and centre part of the panel and by "outwardly" mainly horizontally away from the centre part of the panel.

By "locking systems" are meant co acting connecting elements, which connect the floor panels vertically and/or horizontally. By "strip plane" is meant a horizontal plane positioned at the lowest part of the upper strip body surface. By "groove plane" is meant a horizontal plane positioned at the upper and inner part of a locking groove.

Related Art and Problems Thereof

FIGS. 1*a* and 1*b* show a LVT floor panel with a locking system that is locked with angling. The horizontal locking is obtained by a locking strip 6 having a strip body 7 and a locking element 8 formed at one panel edge 1 that locks into a locking groove 14 formed in another adjacent panel edge 1'.

The strip body 7 has a strip surface 7*a*. A strip plane SP is positioned at the lowest part of the strip surface 7*a*. The locking groove 14 has a vertical extension that is needed to house the locking element 8. A groove plane GP is positioned at the upper part of the locking groove 14. The floor panel thickness must be adapted to this required vertical distance between the strip plane SP and the groove plane GP. The thickness of the floor panel may be decreased by 25% and more if it would be possible to use a locking system where the vertical distance between the strip plane SP and the groove plane GP may be reduced or even completely eliminated.

It would be a major advantage if thin panels may be locked with a locking system that do not require deep vertical locking grooves and locking elements that extend vertically from the main strip body. It would also be an advantage if the weight may be decreased and if problems related to temperature changes, especially in installations with floor heating, may be eliminated.

SUMMARY

An overall objective of embodiments of the present disclosure are to provide an improved and more cost efficient locking system that may be used in primarily thin floorings and floorings with soft flexible core layers.

A specific objective is to decrease weight of LVT floors and adapt the panel such that it is suitable to be installed in areas, which are subjected to considerable temperature changes. Another specific objective is to provide cost efficient production methods to produce locking systems in especially thin floor panels.

The above objects of embodiments of the disclosure are achieved wholly or partly by locking systems and floor panels according to embodiments of the disclosure.

A first aspect of the disclosure is building panels provided with a locking system for vertical and horizontal locking of a first and a second edge of adjacent panels. Said locking system comprising a tongue and a tongue groove for vertical locking. A strip at the first edge is provided with a locking element, which cooperates for horizontal locking with a downwardly open locking groove formed in the second adjacent edge. The strip comprises a strip body with a cavity and the second edge comprises a local protrusion that extends downwards. The protrusion is located in the cavity when the panels are locked vertically and horizontally.

The locking element may be a part of the cavity and the strip body may comprise several cavities.

The second edge may comprise several local protrusions.

The locking element and/or the protrusions may discontinuous along the edge.

The strip body may comprise a horizontal strip plane that is positioned at the lowest part of the upper strip surface and a locking groove that comprise a horizontal groove plane that is positioned at the upper and inner part of the locking groove, such that the strip plane and the groove plane are closer to each other vertically than the vertical extension of the locking element.

The locking system may comprise a strip plane and groove plane that are located essentially on the same horizontal plane.

A second aspect of the disclosure is a method to produce a panel with a locking system. The method comprises the steps of:

a) forming a part of the cavities with punching; and b) forming a part of the protrusions by a screw cutter.

The locking system may be formed on long and/or short edges and may be locked with angling and/or horizontal snapping and/or vertical folding.

A third aspect of the disclosure is a building panel according to the first aspect produced by the method according to the second aspect.

A fourth aspect of the disclosure is building panels provided with a locking system for vertical and horizontal locking of a first and a second edge of adjacent panels. Said system is configured to lock the edges by a vertical displacement of the adjacent edges relative each other. The locking system comprises a separate tongue fixed into a fixation groove. Said tongue cooperates with a tongue groove for vertical locking. A strip at the first edge is provided with a locking element, which cooperates for horizontal locking with a downwardly open locking groove formed in the second adjacent edge.

The strip comprises a strip body with a cavity and the second edge comprises a local protrusion that extends downwards. The protrusion is located in the cavity when the panels are locked vertically and horizontally. A lower part of the tongue groove is in locked position located essentially on the same horizontal plane as an upper part of the strip surface.

The locking element may be a part of the cavity.

The strip body may comprise several cavities.

The second edge may comprise several local protrusions.

A fifth aspect of the disclosure is building panels provided with a locking system for vertical and horizontal locking of a first and a second edge of adjacent panels. Said system is configured to lock the edges by a vertical displacement of the adjacent edges relative each other. The locking system comprises a tongue, which cooperates with a tongue groove or an undercut for vertical locking. A strip at the first edge is provided with a locking element, which cooperates for horizontal locking with a downwardly open locking groove formed in the second adjacent edge. The strip comprises a strip body with a cavity. The second edge comprises a local protrusion that extends downwards. The protrusion is located in the cavity when the panels are locked vertically and horizontally.

The tongue may be located at a lower part of the protrusion.

A sixth aspect of the disclosure is a method to produce a panel comprising a locking system that locks vertically and/or horizontally. The method comprises the steps of:

- forming a part of the locking system with knives that comprise an essentially V or U shaped open cutting edge; and
- displacing cut-off material such that it flows in the inner part of the open cutting edge during cutting.

A seventh aspect of the disclosure is a method to separate a sheet into a first and a second floor panel and to form two adjacent edges comprising a locking system that locks vertically and/or horizontally. The first edge comprises a lower part that protrudes horizontally beyond an upper part and the second edge comprises an upper part that protrudes horizontally beyond a lower part. The method comprises the step of:

- cutting the sheet and separating the panels by cutting knives that cuts horizontally and vertically; and
- forming the lower part on the first panel and the upper part on the second panel by said cutting.

An eight aspect of the disclosure are floor panels, provided with a locking system for vertical and/or horizontal locking of a first and a second edge of adjacent panels, comprising a plastic wear layer and one or several plastic core layers with several essentially vertical flexing grooves that have a vertical extension of at least about one third of the core thickness.

The flexing grooves may be covered with an underlay.

The flexing grooves may be essentially parallel with the long edges and have a length that is smaller than the distance between the locking systems on the short edges.

A ninth aspect of the disclosure is resilient floor panels with long and short edges provided with a locking system for vertical and/or horizontal locking of a first and a second edge of adjacent panels. The panels comprise a resilient material that allows a bending with overlapping short edges. One of the long edges is provided with a plastic locking strip extending along the edge and protruding horizontally from the edge. The locking strip comprises at least one vertically extending protrusion configured to be inserted into a locking groove formed at the adjacent edge.

The locking strip may be a thermoplastic extruded section.

The floor panel may have a length that is at least 15 times larger than the width.

BRIEF DESCRIPTION OF THE DRAWINGS

The disclosure will in the following be described in connection to exemplary embodiments and in greater detail with reference to the appended exemplary drawings, wherein.

DESCRIPTION OF EMBODIMENTS

To facilitate understanding, several locking systems in the figures are shown schematically. It should be emphasized that improved or different functions may be achieved using combinations of the embodiments.

All embodiments may be used separately or in combinations. Angles, dimensions, rounded parts, spaces between surfaces etc. are only examples and may be adjusted within the basic principles of the disclosure.

Figure 1A:
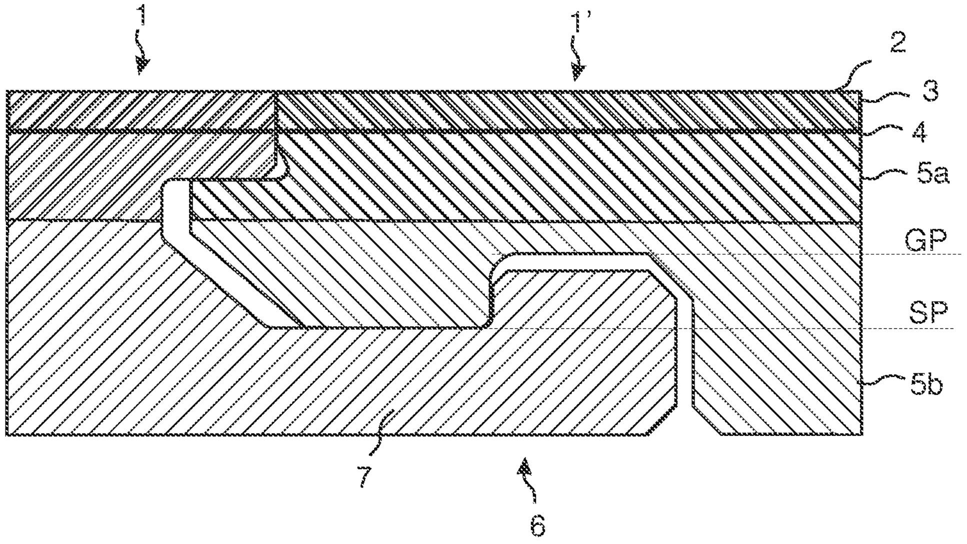
FIGS. 1*a-b* illustrate floor panels and locking systems according to known technology.
Figure 1B:
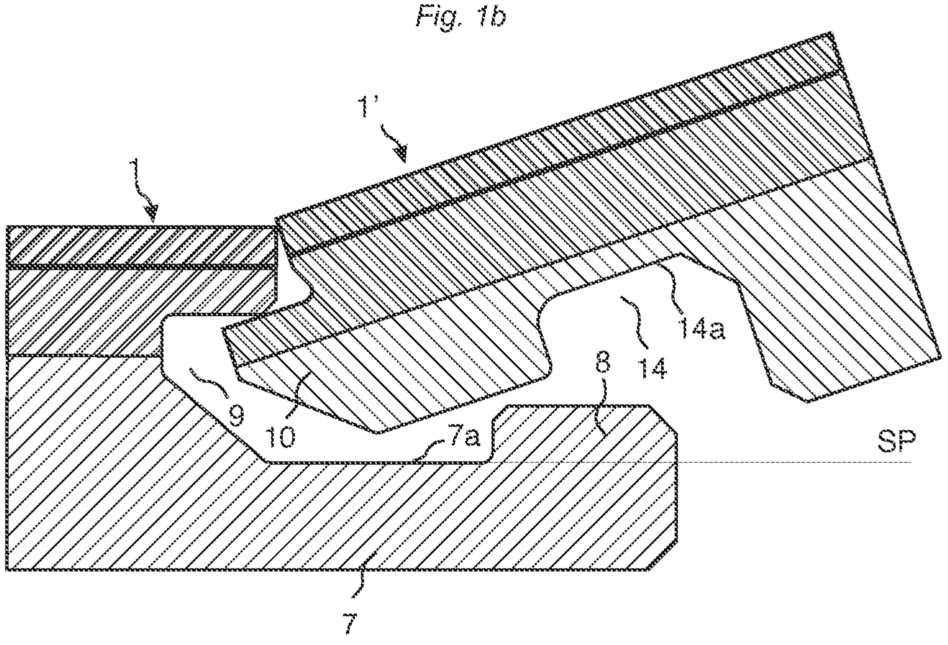
Figure 2A:
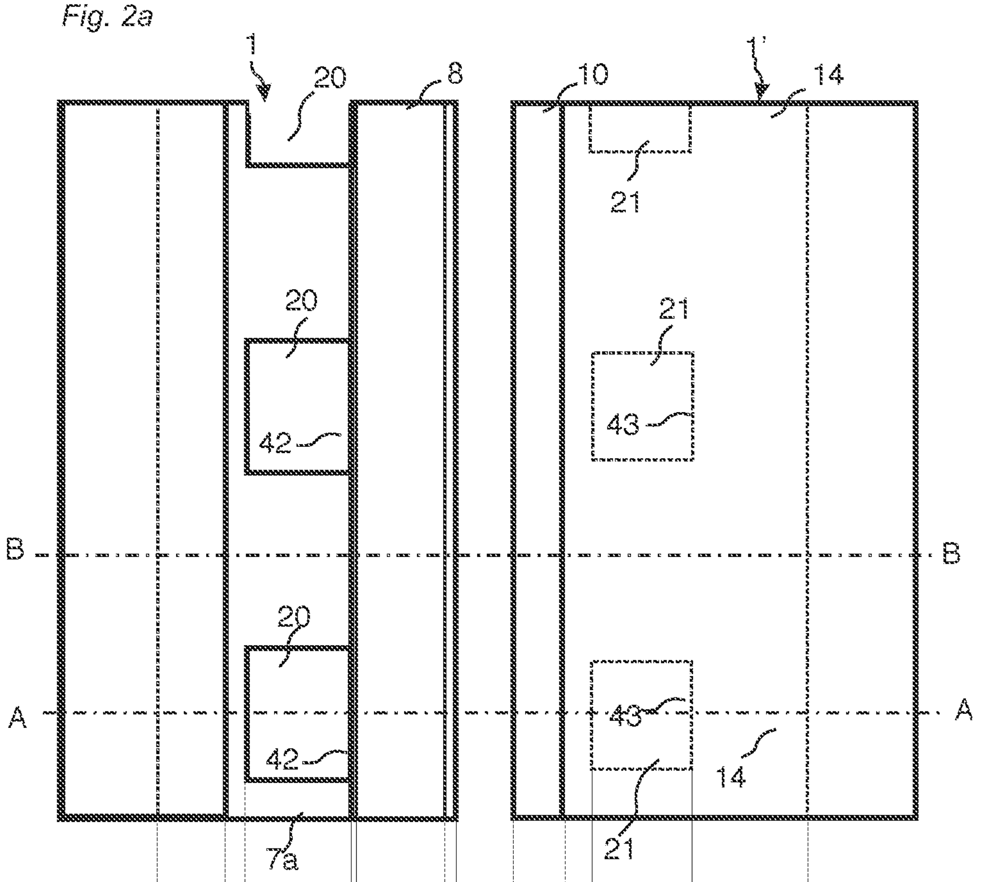
FIGS. 2*a-c* illustrate two edge sections with a locking system according to an embodiment of the disclosure.

FIG. 2*a* shows from above an edge section of a first 1 and a second panel 1' according to one embodiment of the disclosure. Several cavities 20 are formed in the strip body 7 from the strip surface 7*a* to the rear side of the panel 1. The cavities extend horizontally to the locking element 8. Cooperating vertically extending protrusions 21 are formed on the second panel 1' between the locking groove 14 and the tongue 10. The locking element 8, in this embodiment, continues along the joint. The cooperation locking surfaces 42, 43 of the locking element and the locking groove are discontinuous.

Figure 2B:
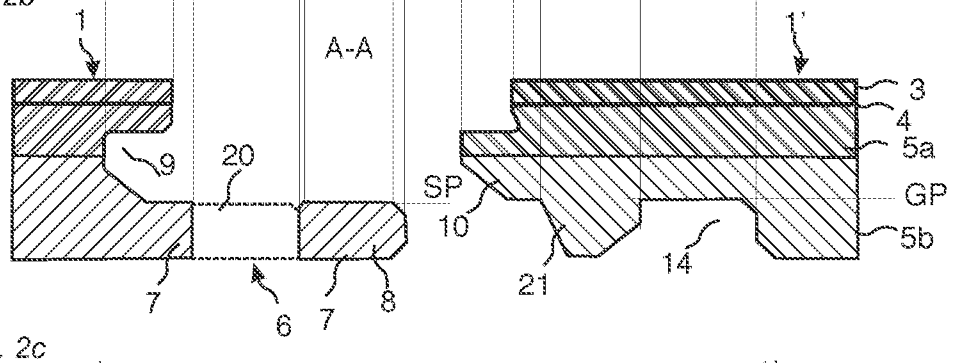

FIG. 2*b* shows a cross section A-A that intersects a cavity 20 and a protrusion 21. The strip plane SP and the groove plane GP are located essentially in the same horizontal plane. The protrusion 21 is formed such that it may be inserted in the cavity 20. The extension of the protrusion in the length direction of the joint is smaller than the corresponding extension of the cavity.

It is preferred that the protrusion is 2-5 mm smaller such that a precise positioning during locking is not required when a first panel in a row is installed.

The locking element 8 is located completely below the strip surface 7*a* and the strip plane SP. This makes it possible to decrease the floor thickness since no locking groove 14 is needed that extends above the strip plane SP.

Figure 2C:
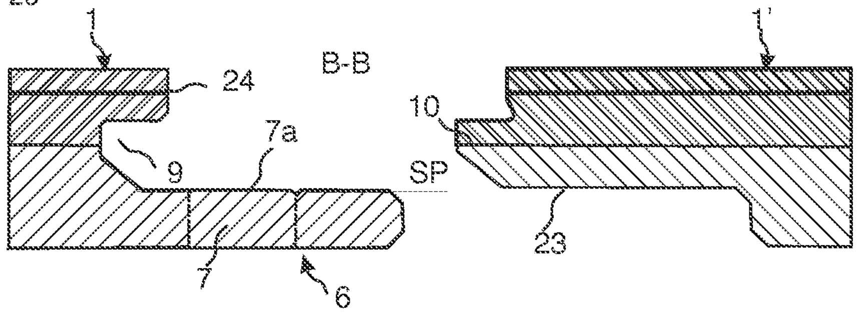

FIG. 2*c* shows a cross section B-B that intersects a part of the strip 6 where no cavity is formed. This unbroken strip body is connected to the locking element 8. The adjacent second edge 1' has no protrusion and no locking groove. The lower part of the edge 23 is essentially flat and extends essentially horizontally.

Figure 3A:
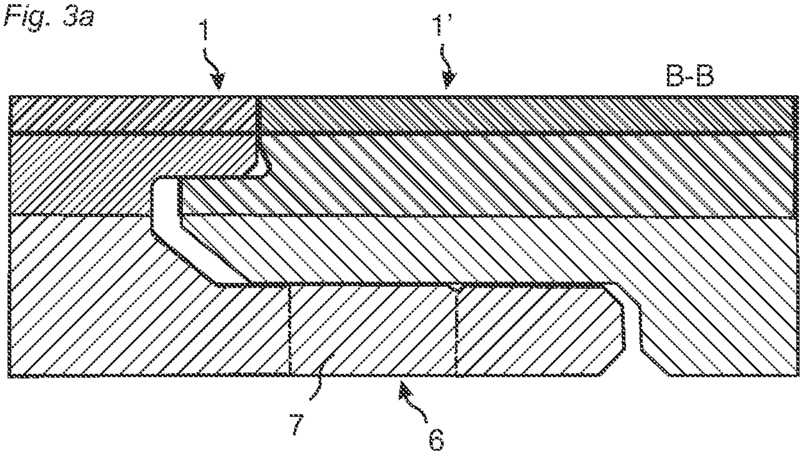
FIGS. 3*a*-3*c* illustrate locking with a locking system according to an embodiment of the disclosure.
Figure 3B:
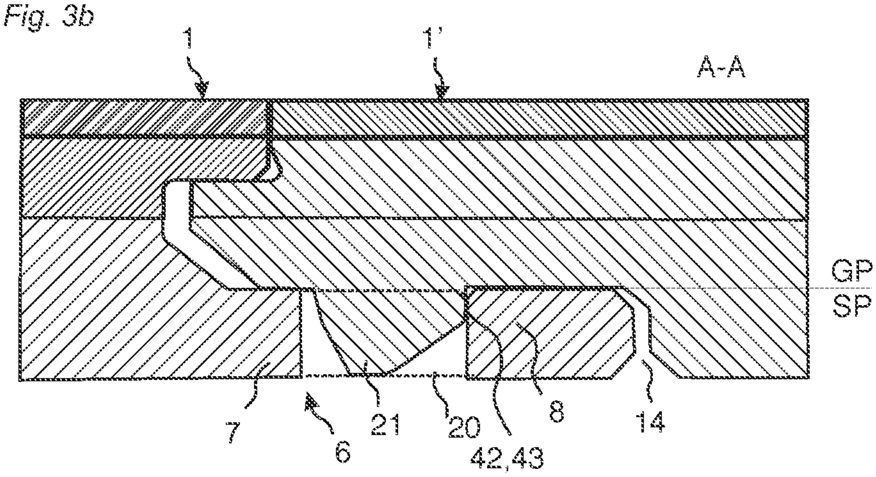
Figure 3C:
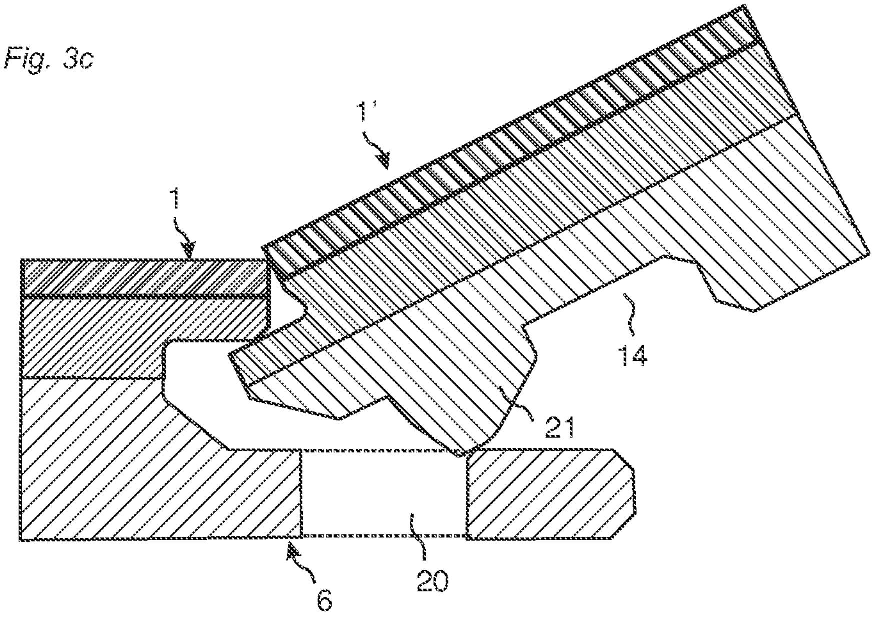

FIGS. 3*a* and 3*b* shows the cross sections B-B and A-A in locked position. FIG. 3*c* shows locking by angling. The locking system may also be designed such that it may be locked by horizontal and/or vertical snapping where a strip bends backwards or a small tongue 10 is pressed into a tongue groove.

Figure 4A:
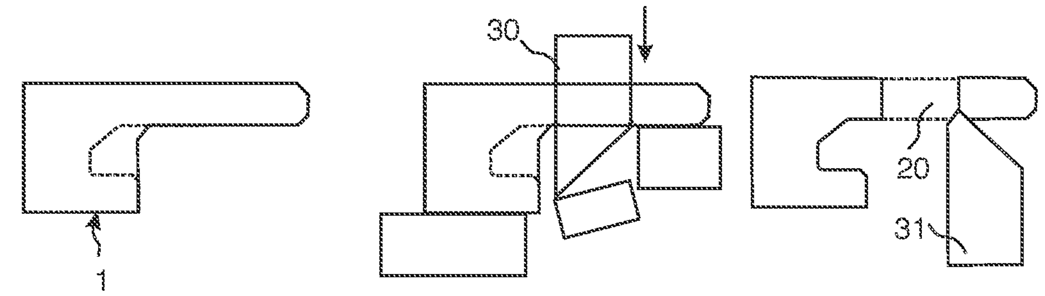
FIGS. 4*a-d* illustrate production methods to form a locking system according to embodiments of the disclosure.

FIG. 4*a* shows a method to form the cavity 20 with punching. The panel is machined with the surface layer pointing downwards. A punching wheel 30 may be used to form cavities 20 in line with the machining of the locking system when the panel is displaced in relation to rotating cutting tools. The cavities may be formed as an intermediate step, when a part of the locking system is formed, or as a last step when the whole edge is formed—in line or as a separate operation. A rotating cutting tool 31 may be used, preferably after punching, to form small guiding surfaces on the locking element.

Figure 4B:
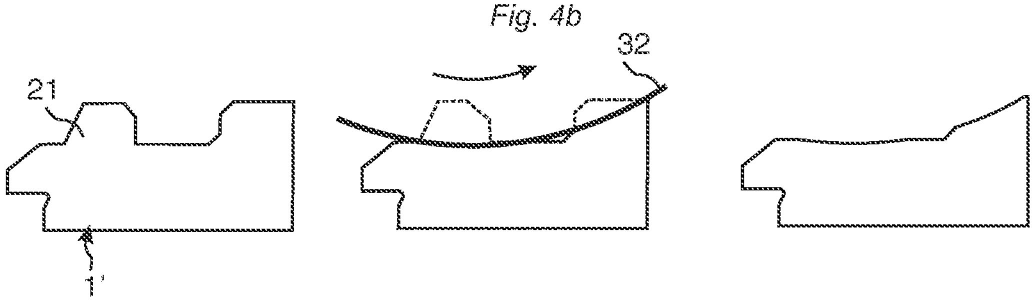

FIG. 4*b* shows a method to form local protrusions 21 with a screw cutter 32 that cuts perpendicularly along the joint. Moving saw blades may also be used.

Figure 4C:
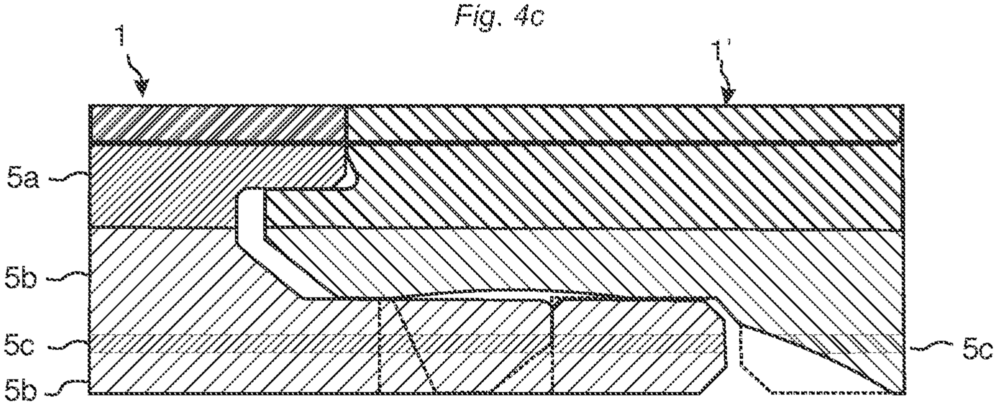
Figure 4D:
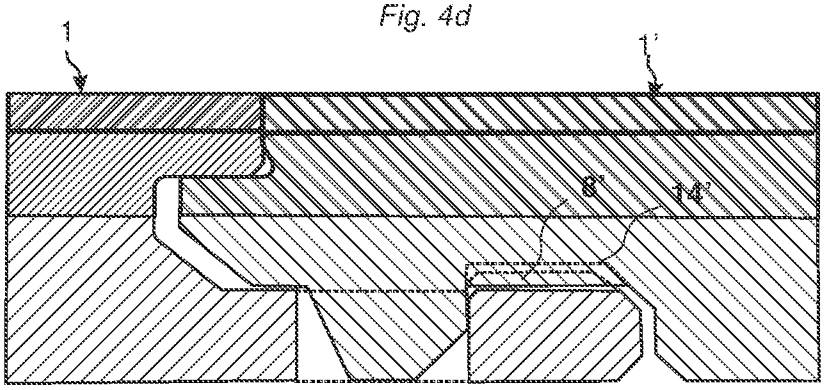

FIGS. 4*c* and 4*d* shows adjacent edges in locked position. FIG. 4*d* shows that embodiments of the disclosure may be combined with a preferably small locking element 8' that preferably comprises upper guiding surfaces, and a small locking groove 14'.

FIG. 4*c* shows that the building panel may comprise a third core layer 5*c*, preferably positioned vertically within the strip 7, such that the strip 7 is reinforced. The third layer is in a preferred embodiment positioned at the cooperating surfaces of the locking element 8 and the locking groove 14. Such a layer increases the locking strength and makes it easier to position the locking element 8 into the locking groove 14. The core may comprise several such layers.

Figure 5A:
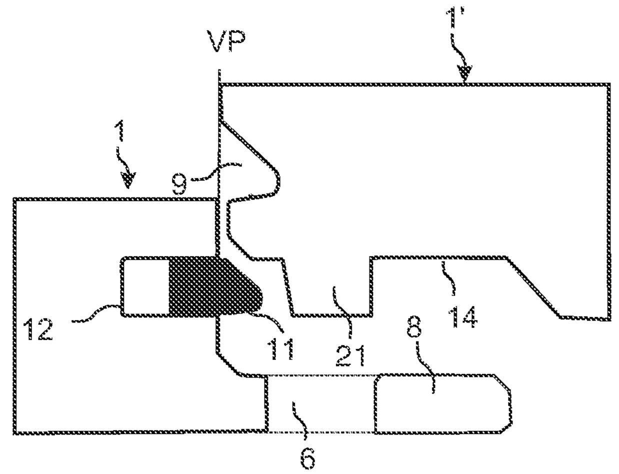
FIGS. 5*a-d* illustrate a locking system according to an embodiment of the disclosure that may be locked with vertical folding.
Figure 5B:
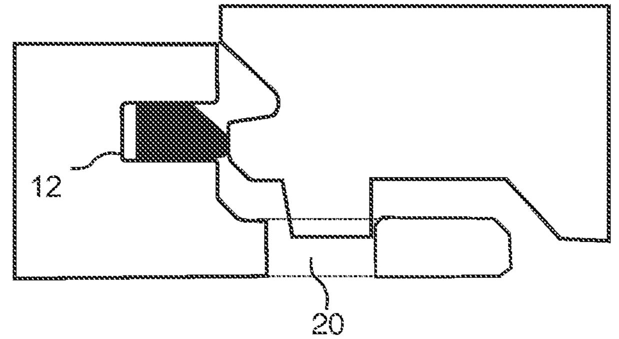
Figure 5C:
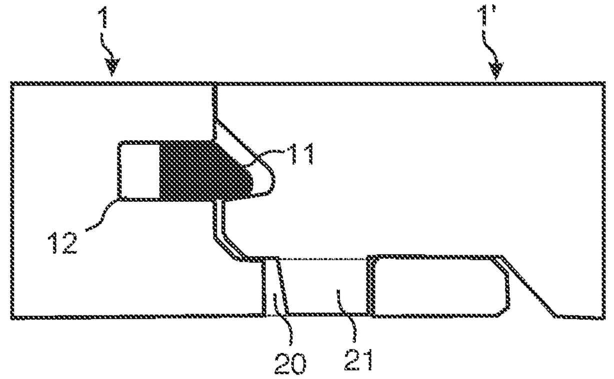
Figure 5D:
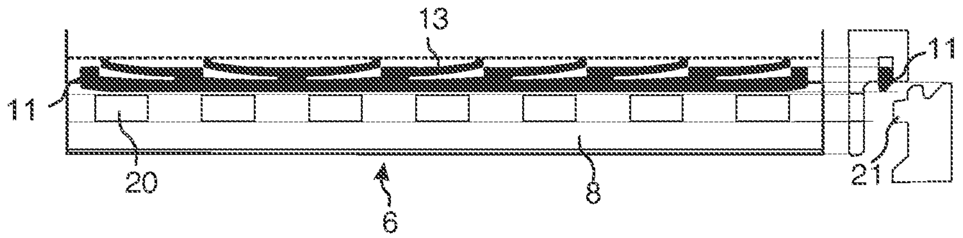
Figure 6A:
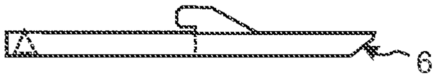
FIGS. 6*a-d* illustrate a separate strip part connected to an edge according to an embodiment of the disclosure.
Figure 6B:
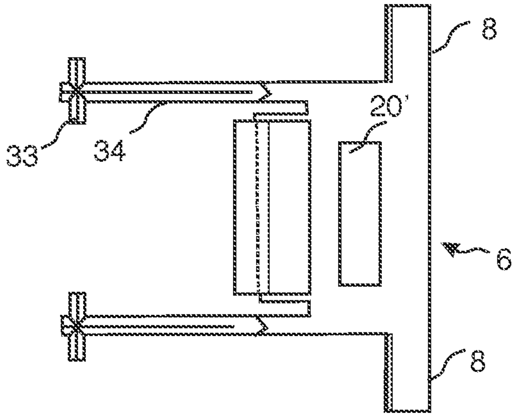
Figure 6C:
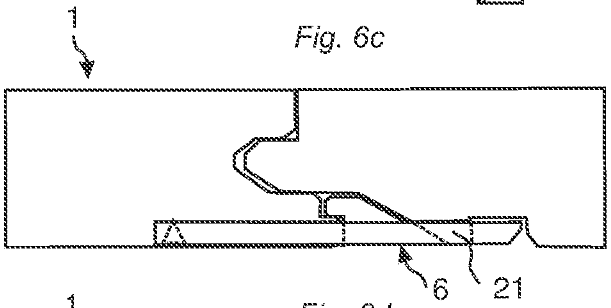
Figure 6D:
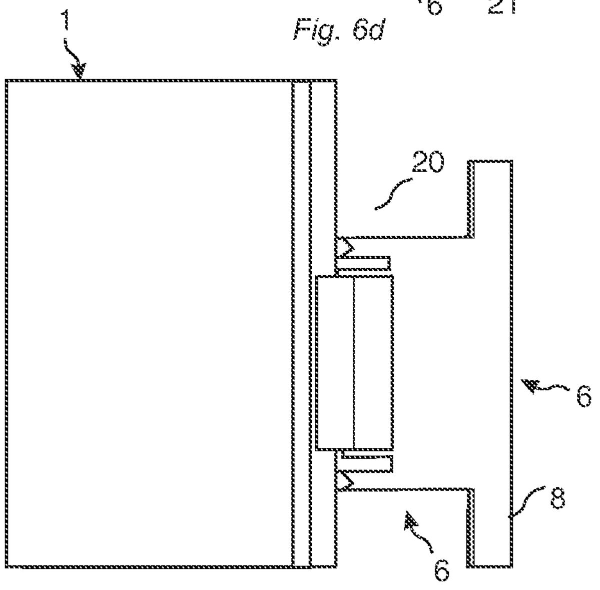

FIGS. 5*a*-5*c* shows that the horizontal locking according to an embodiment of the disclosure may be combined with a flexible and displaceable tongue 11 that is fixed into a horizontally extending fixation groove 12 and that snaps during vertical folding. The disclosure may be used in combination with all known so called fold down systems that are locked with vertical snapping during folding or a side push action after folding when the panels are lying flat on the sub floor. The separate tongue 11 may be fixed to the first 1 or second panel 1' edge. FIG. 5*d* shows a flexible bristle tongue that comprises flexible protrusions 13. The tongue is displaced in the fixation groove 12 during folding. A separate tongue may also be fixed into a groove and may comprise an outer part that is flexible.

FIGS. 6*a*-6*d* shows that the principles of embodiments of the disclosure may be combined with a separate strip part 6 that is attached to the panel edge and that comprises cavities 20, 20'. The strip part 6 comprises fixing element 33 and strip legs 34 that may be inserted in grooves or pressed into the plastic core. The strip part 6 may be formed such that it may be connected to the panel edge with essentially a horizontal snapping.

Figure 7A:
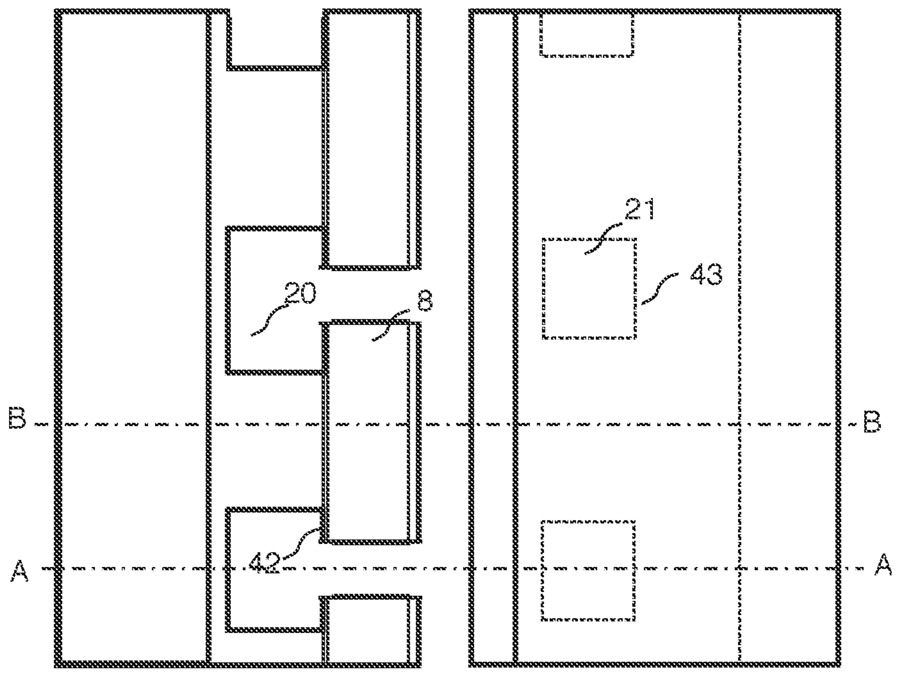
FIGS. 7*a-b* illustrate embodiments of the disclosure.
Figure 7B:
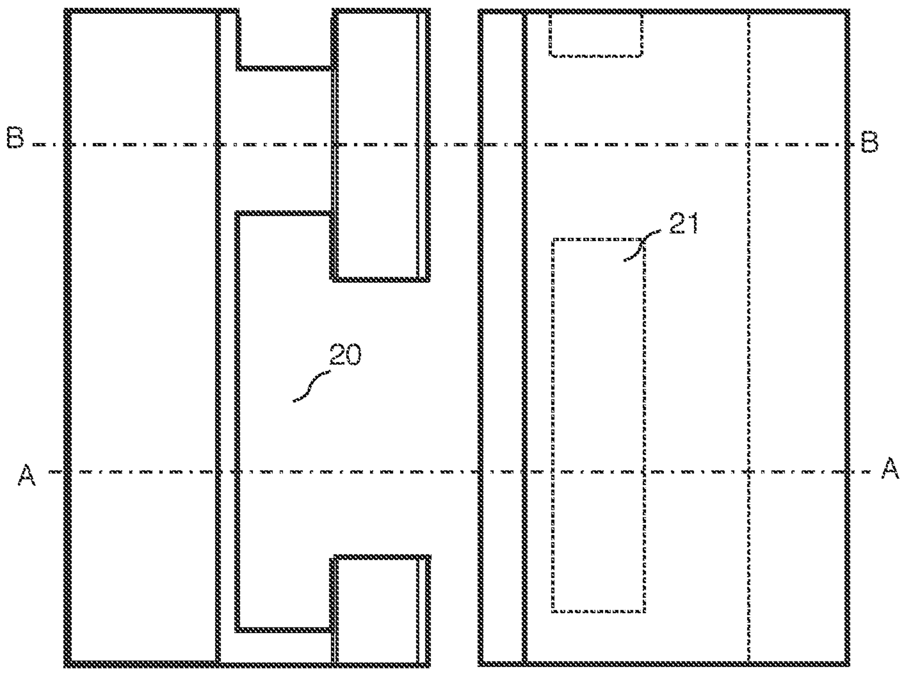

FIGS. 7*a* and 7*b* show cavities that are formed such that the locking element 8 is discontinuous along the joint.

Embodiments of the disclosure make it possible to form a strong locking in in 3 mm floor panels or even thinner. The floor panel may be formed with an upper lip 24, as shown in FIG. 2*c*, of about 1 mm, a tongue 10 and a tongue groove 9 of about 1 mm and a strip body of about 1 mm. The locking element 8 and the locking groove 14 need no material and this means that considerable cost savings may be reached by decreasing the panel thickness.

Figure 8A:
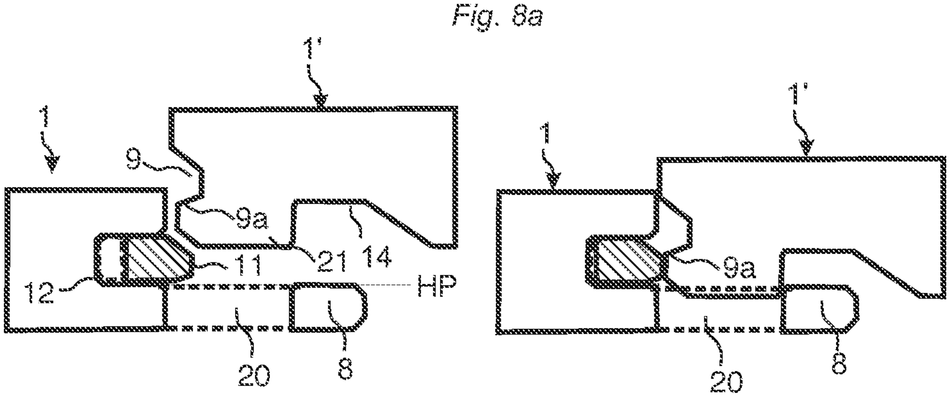
FIGS. 8*a-d* illustrate a fold down locking system with a separate tongue according to an embodiment of the disclosure.
Figure 8B:
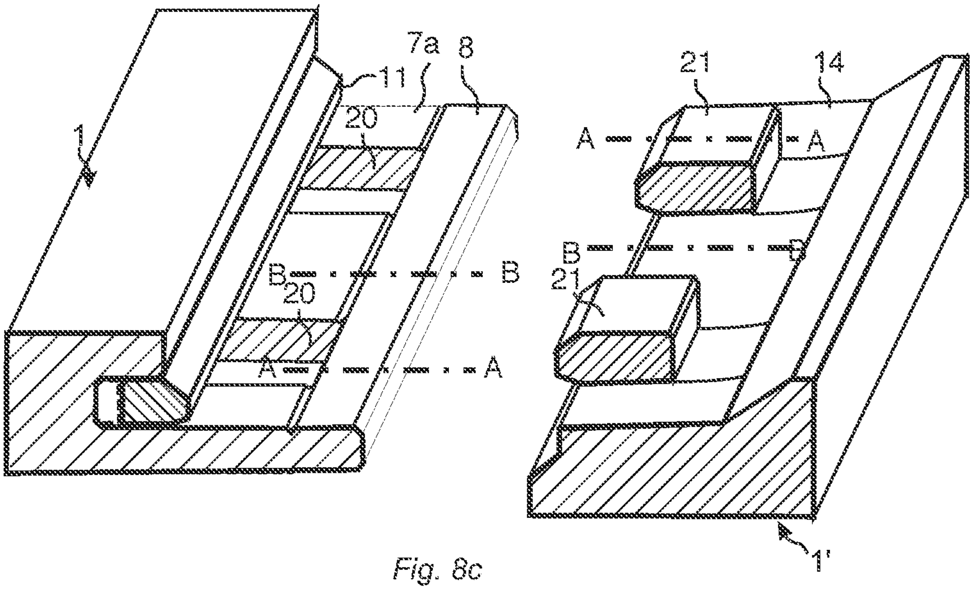
Figure 8C:
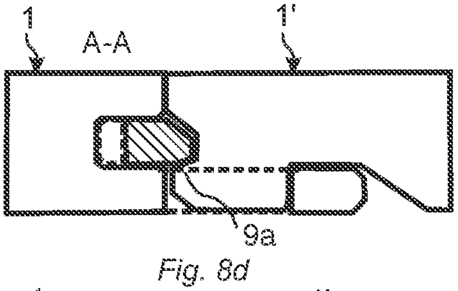
Figure 8D:
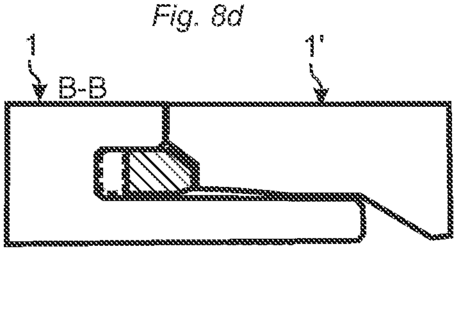

FIGS. 8*a*-8*d* shows a fold down locking system suitable for very thin floor panels. A separate and preferably flexible and/or displaceable tongue 11 may be inserted into a fixation groove 12 that is formed such that its lower part is located essentially on the same horizontal plane HP as the upper part of the strip 6. The strip 6 is an extension of the lower part of the fixation groove 12. The lower part 9*a* of the tongue groove 9 is in locked position located essentially on the same horizontal plane HP as the upper part of the strip surface 7*a*. FIG. 8*b* shows the second panel 1' turned upside down with the surface pointing downwards. The separate tongue 11 overlaps vertically an inner part of the cavity 20. An advantage is that the locking system may be formed in a thinner panel since the protrusions 21 are located in the cavities 20 below the upper part of the strip surface 7*a*.

Figure 9A:
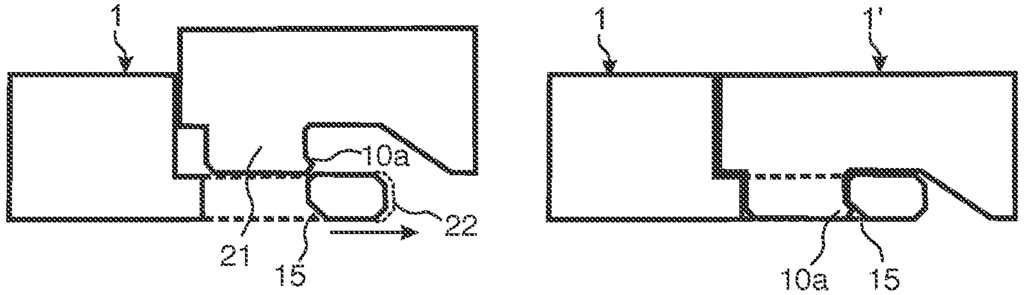
FIGS. 9*a-d* illustrate an embodiment with a fold down locking system with a tongue made in one piece with the panel.
Figure 9B:
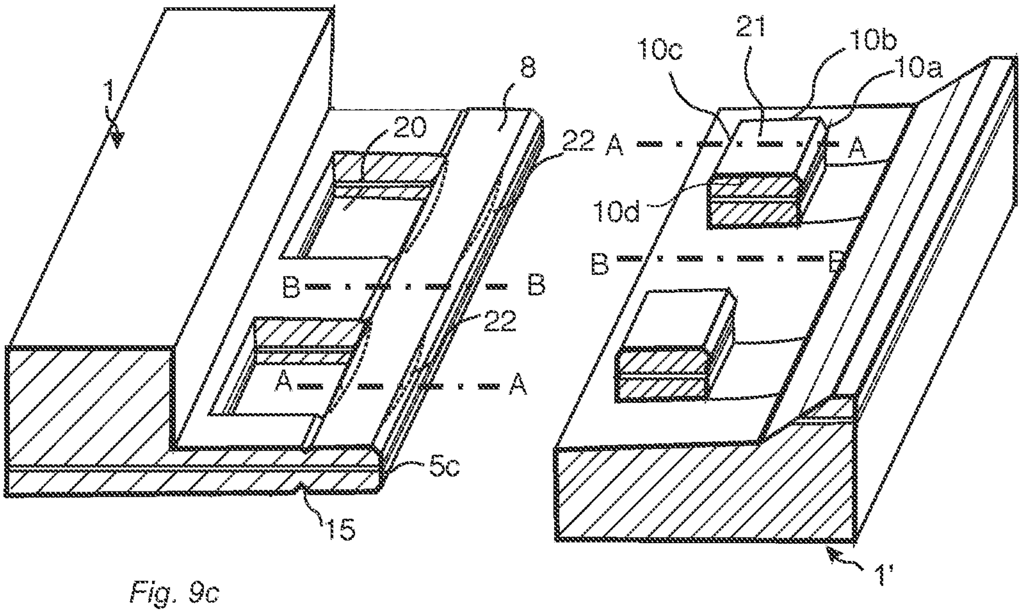
Figure 9C:
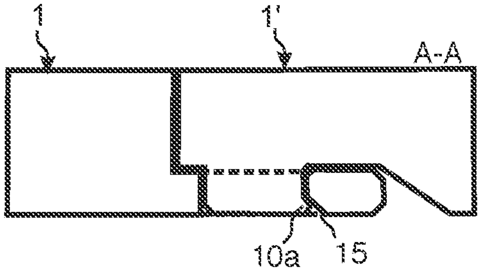
Figure 9D:
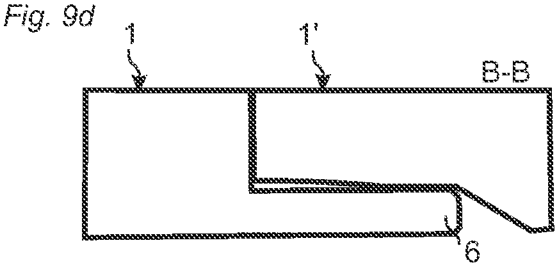

FIGS. 9*a*-9*d* show a locking system that may be locked with a vertical motion and that comprises a tongue 10*a* on the lower part of the protrusion 21. The tongue is in this embodiment formed in one piece with the panel. FIG. 9*b* show that the locking element 8 comprises a flexing part 22 that bends essentially horizontally and outwardly. The tongue 10*a* locks against an undercut 15 formed on the lower part of the cavity 20. It is an advantage if the protrusion 21 is smaller in the length direction of the joint than the corresponding opening of the cavity 20. This facilitates flexing of the flexible part 22 that will be pushed outwardly during locking. The panel may comprise a reinforcement layer 5*c* of for example glass fibre or a strong plastic layer that may increase the strength and flexibility of the locking element. The reinforcement layer is preferably unbroken around the whole cavity 20. One or several tongues may be formed on the protrusion at the outer 10*a* or inner part 10*c* or on one or both edges 10*b*, 10*d* along the joint.

Figure 10A:
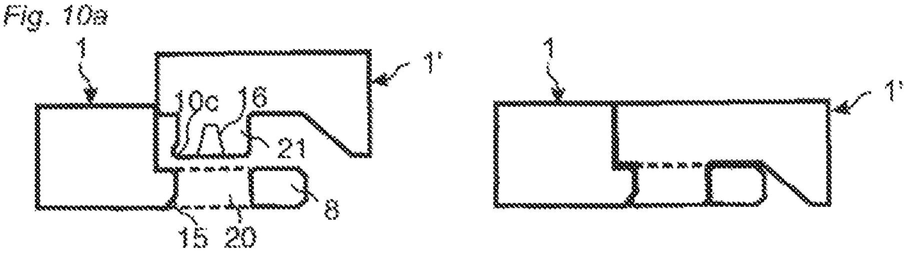
FIGS. 10*a-f* illustrate embodiments of the disclosure.
Figure 10B:
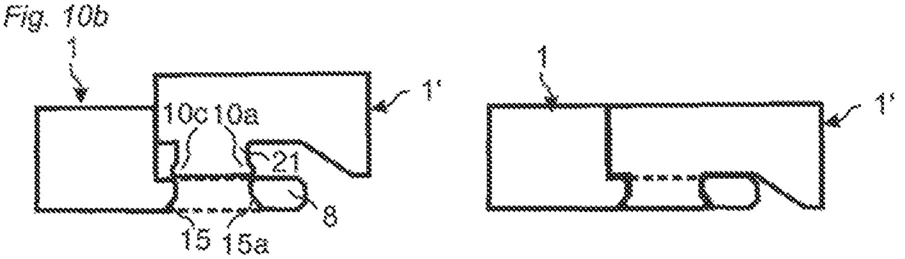
Figure 10C:
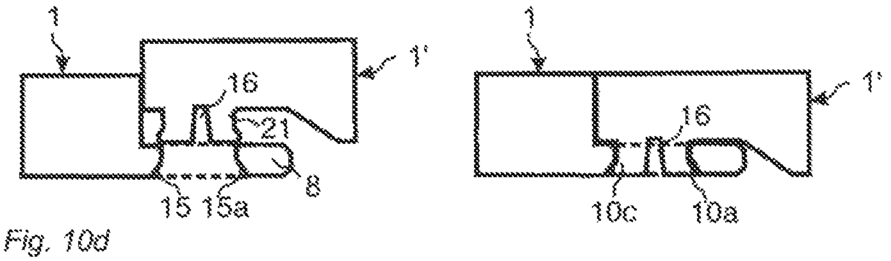
Figure 10D:
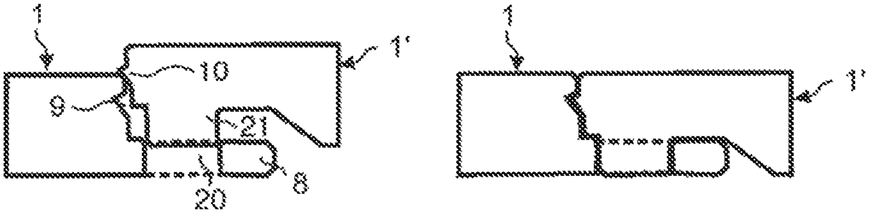
Figure 10E:
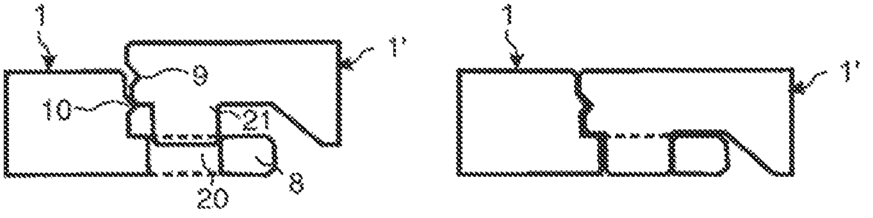
Figure 10F:
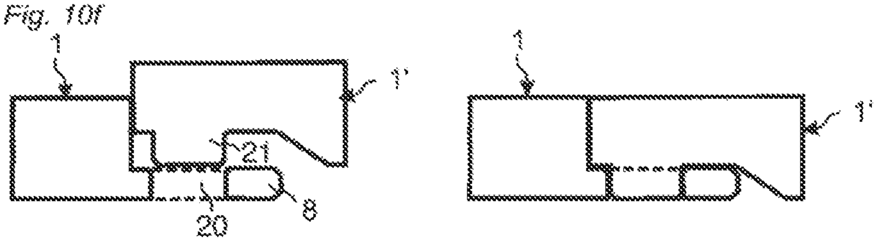

FIGS. 10*a*-10*f* shows different embodiments of the locking system shown in FIG. 9. FIG. 10*a* shows a tongue 10*c* formed at an inner part of the protrusion that may comprise a bending groove 16. FIGS. 10*b* and 10*c* show two tongues 10*a*, 10*c* with corresponding undercuts 15, 15*a*. FIGS. 10*d* and 10*e* show a tongue and groove connection 10,9 formed at an upper edge above the strip and FIG. 10*f* shows a hook connection that only locks horizontally.

All embodiments shown in this description may be partly or completely combined and may be used optionally on long and/or short edges.

Figure 11A:
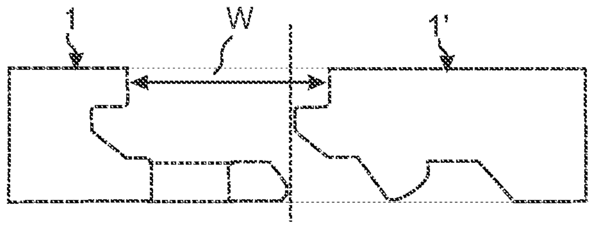
FIGS. 11*a-f* illustrate separation of panels according to embodiments of the disclosure.
Figure 11B:
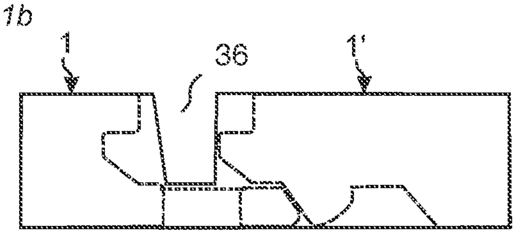
Figure 11C:
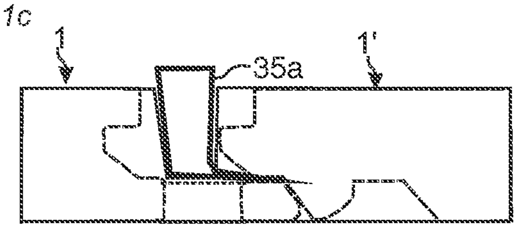
Figure 11D:
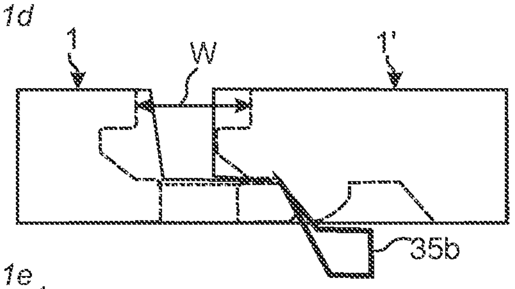
Figure 11E:
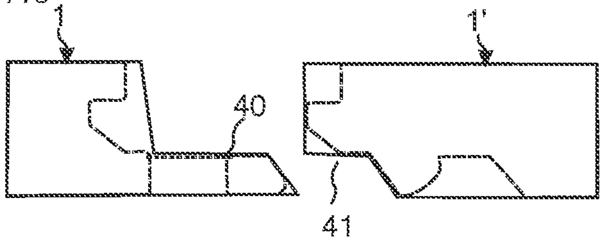
Figure 11F:
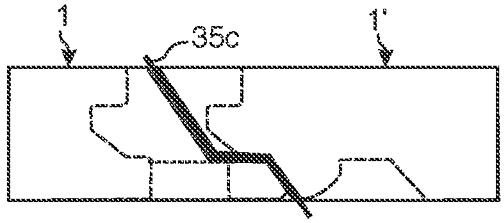

LVT panels are produced in sheets that are cut vertically into several individual floor panels 1,1. The forming of the locking system creates a waste W, as shown in FIG. 11*a*. FIGS. 11*b*-11*f* show that cutting the individual panels vertically and horizontally may reduce the waste W. A cutting groove 36 is preferably formed with knifes, carving tool or rotating cutting tools and various combinations of such tools. The panels are thereafter separated by a knife 35*a* that cuts essentially horizontally and a knife or carving tool 35*b* that cuts essentially vertically. FIG. 11*e* shows that the first edge 1 is formed with a lower part 40 that protrudes horizontally beyond the upper part and the second edge 1' is formed with an upper part 41 that protrudes horizontally beyond the lower part. A non-linear cut with knives or scraping tool may be formed and this may give considerable material savings. FIG. 11*f* shows that the whole cut may be formed with one knife 35*c* that cuts vertically and horizontally.

Figure 12A:
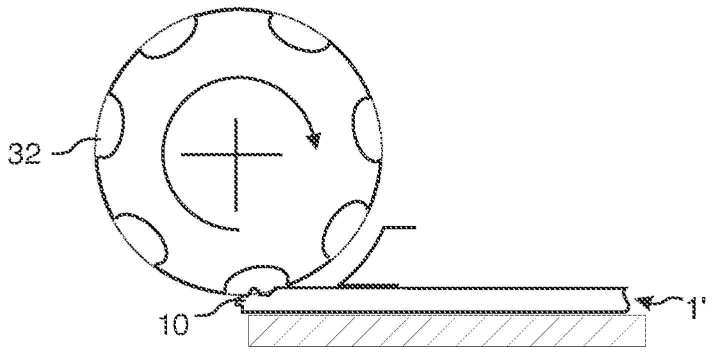
FIGS. 12*a-b* illustrate an embodiment comprising cutting with a screw cutter.
Figure 12B:
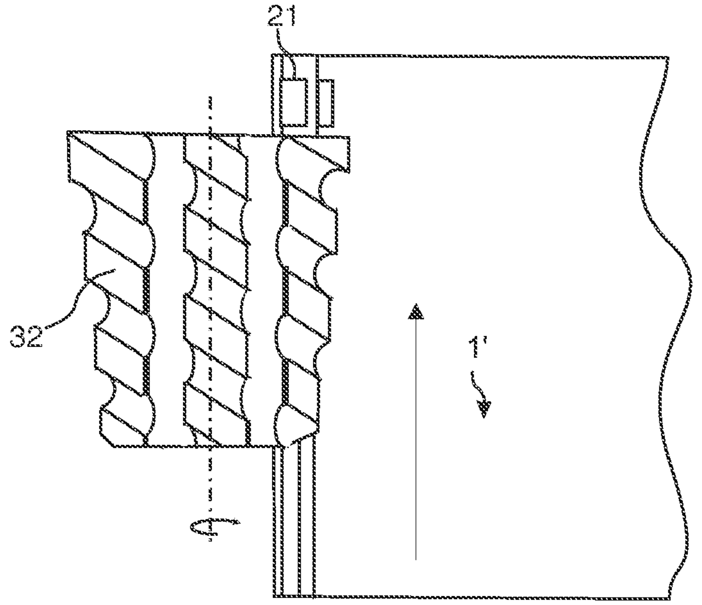
Figure 13A:
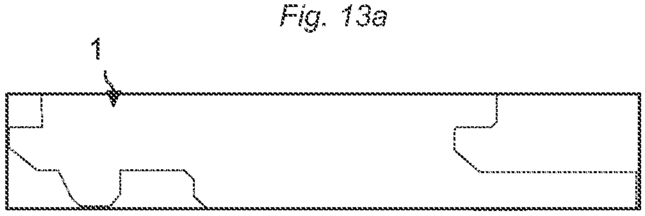
FIGS. 13*a-d* illustrate an embodiment comprising forming of a locking system with several knives.
Figure 13B:
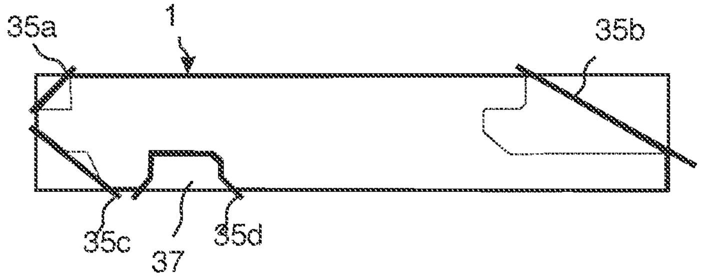
Figure 13C:
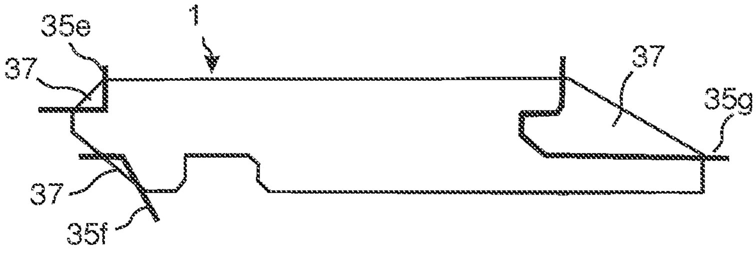
Figure 13D:
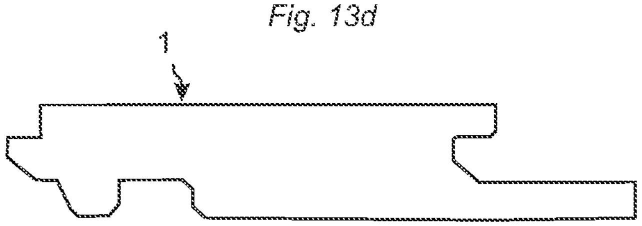

FIGS. 12*a* and 12*b* show forming of the panel edges by a screw cutter 32 that cuts perpendicularly to the displacement direction of the panel 1' and forms the protrusions 21.

A locking system in a plastic based LVT flooring may be formed with traditional rotating cutting tools that cut as a saw blade but also partly or completely with cutting knives that may be fixed or rotating. Carving tools may also be used. FIGS. 13*a*-13*d* show that all parts of a mechanical locking system may be formed by cutting knifes which have a straight cutting edge 35*a*, 35*b*, 35*c* or which have an irregular form 35*d*, 35*e*,35*f* and 35*g*. Cutting knives with a straight edge are preferably rotating knives. The irregular knives are preferably formed as open V or U-shaped section that allow the cut-off material to flow in the inner part of the cutting tool 37 such that it may be removed when the tool 35 or the panel 1 is displaced in relation to each other.

The knives may be stationary and the panel may be displaced in relation to the knives. It is also possible to displace the knives in relation to a fixed panel.

Increased temperature will facilitate all type of separation and forming of the edges with for example knives, carving, punching wheels, screw cutters etc. since plastic material is considerable softer when the temperature is increased. The panel may be heated completely or only locally with for example infrared lamps, hot air etc. that heat an edge part.

Bevels or rounded edges are easily formed at increased temperature and with rollers or pressing wheels that compress and form the edges. Such forming devices may be embossed and the edges may be formed with the same structure as the panel surface. A decorative paint may be applied during forming.

Parts of the locking system may also be formed with heat and rollers that press and form the edge.

LVT floors are very moisture stable but they expand or shrink when the temperature is changing. Some LVT floors may shrink and expand about 2 mm when the temperature is changing from 10 to 40 degrees Celsius. This may cause problems when LVT floors are installed floating especially in a room with floor heating.

The major reason for the temperature sensitivity is the type of plastic (PVC) that is used in the surface and core layers. Adding special fillers into the core layers may decrease the temperature sensitivity.

The expansion and shrinking may be compensated by the flexibility of the panel. This flexibility must be such that the locking system is able to keep the floor together in low temperature and such that the panels will not warp or bend upwards when they expand in high temperature.

Figure 14A:
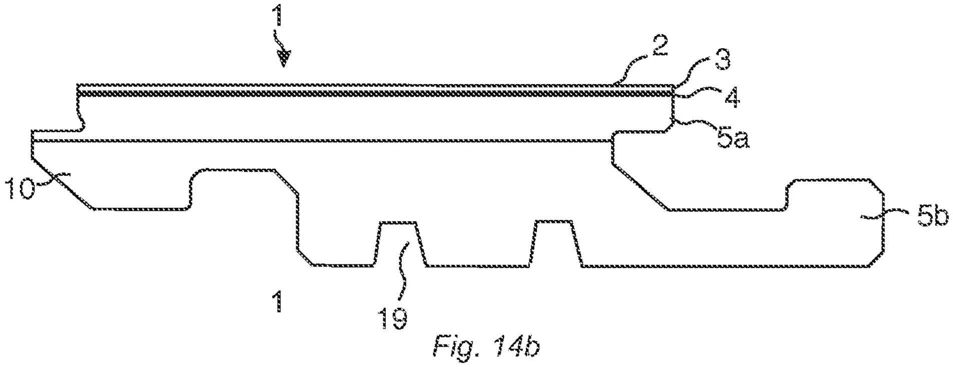
FIGS. 14*a-d* illustrate an embodiment comprising a LVT panel with reduced weight and improved temperature properties.
Figure 14B:
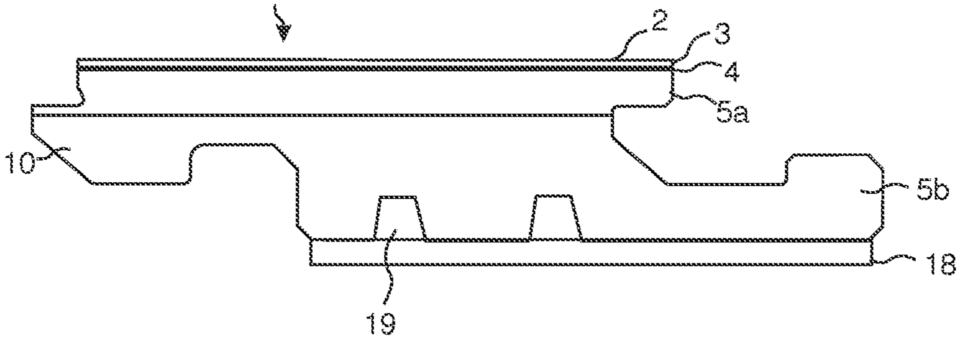
Figure 14C:
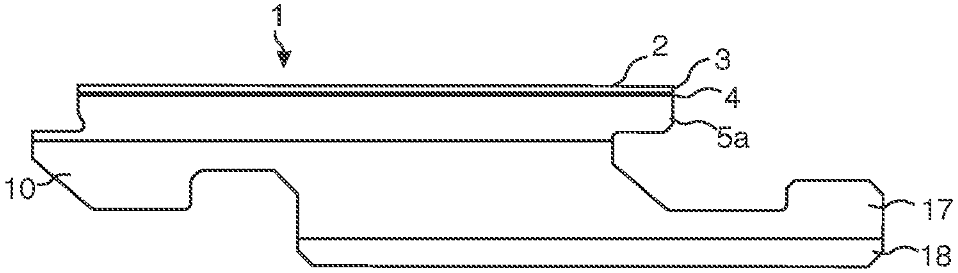
Figure 14D:
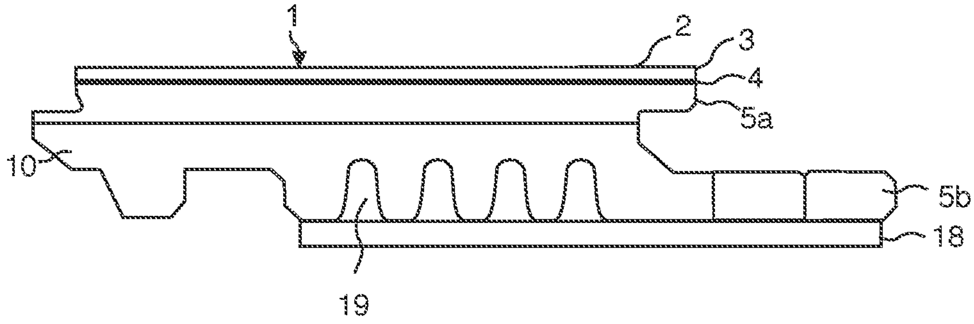

FIGS. 14*a*, 14*b* and 14*d* show that the flexibility may be increased considerably if several flexing grooves 19 are formed at the rear side of the core 5*b*. Such grooves may preferably be formed with knives along and/or across the board. The cut-off material may be recycled completely and used to produce a new core. The grooves may also be formed when the panel is pressed. Such a production method is suitable when the sheets are pressed in a discontinuous press. Knives may preferably be used when the sheets are produced in continuous presses. The material is very easy to remove when the material is hot.

FIGS. 14*b,d* show that the flexing grooves may be covered with an underlay 18 that may be foam or any other plastic material similar to the material used in the core. It is preferred that the flexing grooves 19 have a vertical extension of at least about one third of the core thickness.

The grooves 19 may be used to decrease the weight of the panel.

FIG. 14*c* show that including layers that are more stable, for example one or several layers of glass fibre or a sub core 17 that preferably comprises wood fibres, may increase the temperature stability. The sub core 17 may be a high quality HDF board or wood powder based board with high moisture resistance.

Figure 15A:
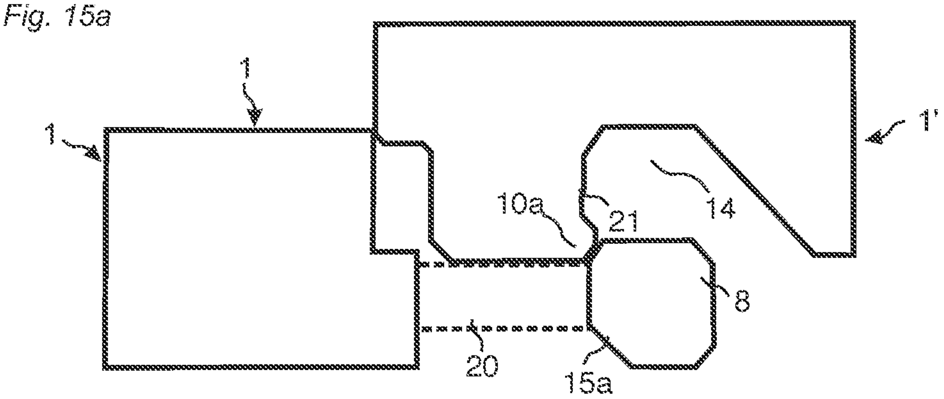
FIGS. 15*a-d* illustrate a locking system installed with a vertical motion.
Figure 15B:
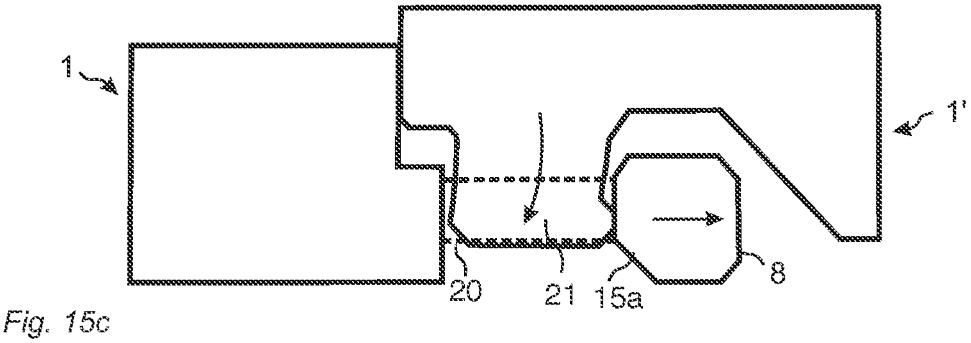
Figure 15C:
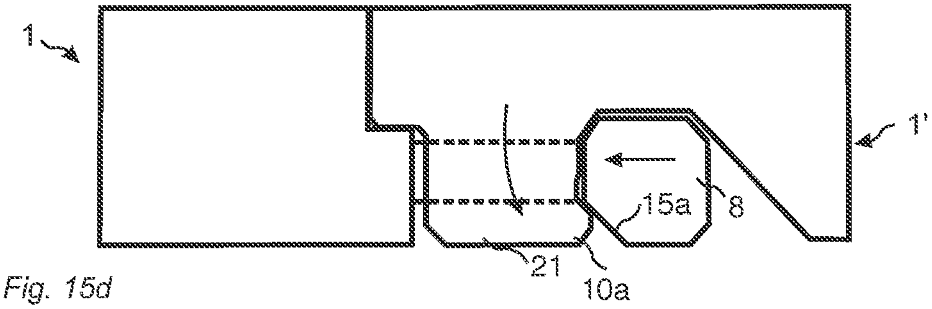
Figure 15D:
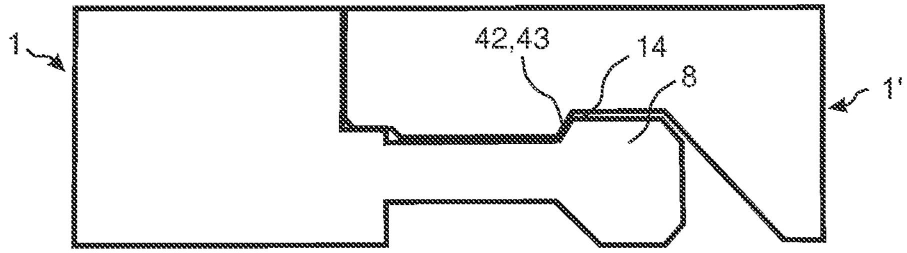

FIG. 15*a-d* show a locking system that is locked with vertical snapping. The protrusion 21 comprises a tongue 10*a* that cooperates with an undercut 15*a* formed at the rear side of the locking element. The tongue 10 may be formed at an inner part of the protrusion 21. The protrusion 21 and the locking element are bent and displaced horizontally during the vertical motion, as shown in FIGS. 15*b* and 15*c*. FIG. 15*d* shows a cross section where no protrusion and cavity are formed. Such cross section has only a horizontal locking. This embodiment is characterized in that the locking system comprises a first set of sections along the joint that locks only horizontally and a second set of sections that locks horizontally and vertically. The locking system is also characterized in that the protrusion 21 and the locking element 8 are displaced horizontally during the vertical motion.

Figure 16A:
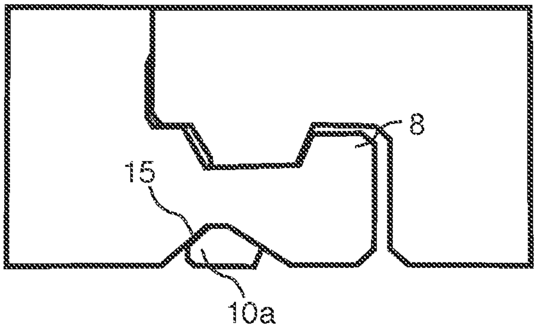
FIGS. 16*a-d* illustrate a locking system installed with a vertical motion.
Figure 16B:
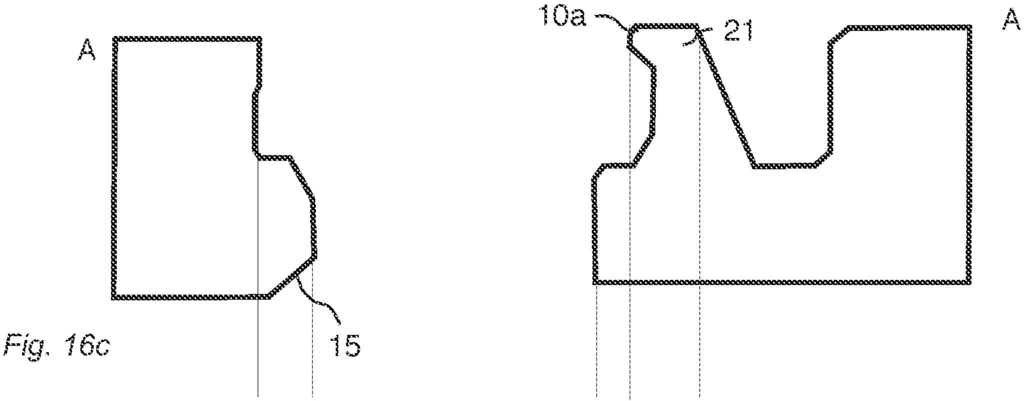
Figure 16C:
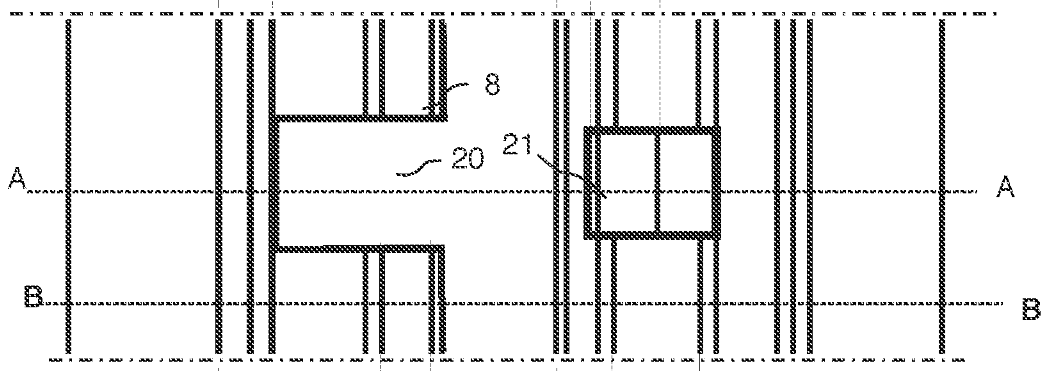
Figure 16D:
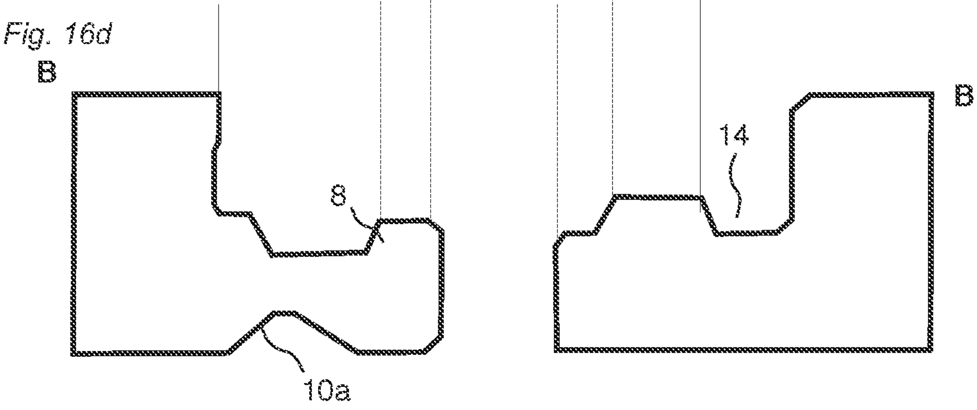

FIGS. 16*a*-16*d* shows a locking system similar to the system shown in FIGS. 15*a-d*. The tongue 10*a* is however formed at an outer part of the protrusion 21. The locking element 8 may also be discontinuous as shown in FIGS. 16*c-d*. Such geometry facilitates the forming of the cavities 20 that may be formed with rotation tools. This embodiment is characterized in that the locking system comprises a first set of sections along the joint (A-A) that locks only vertically and a second set of sections (B-B) that only locks horizontally.

Figure 17A:
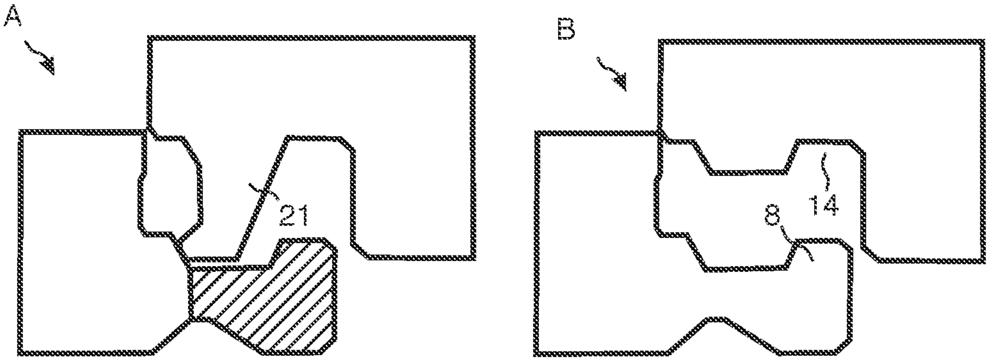
FIGS. 17*a-c* illustrate a locking system installed with a vertical motion.
Figure 17B:
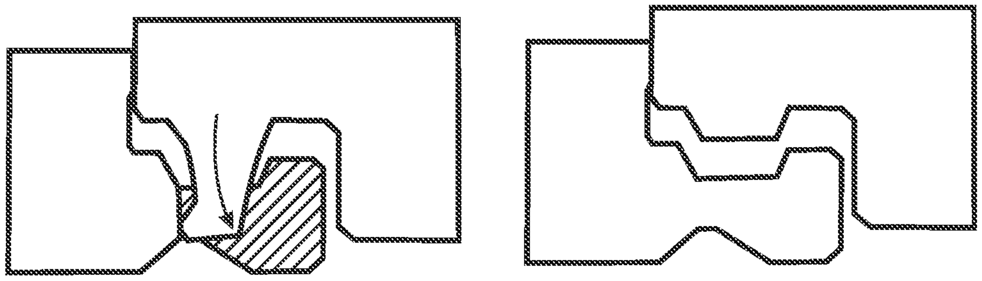
Figure 17C:
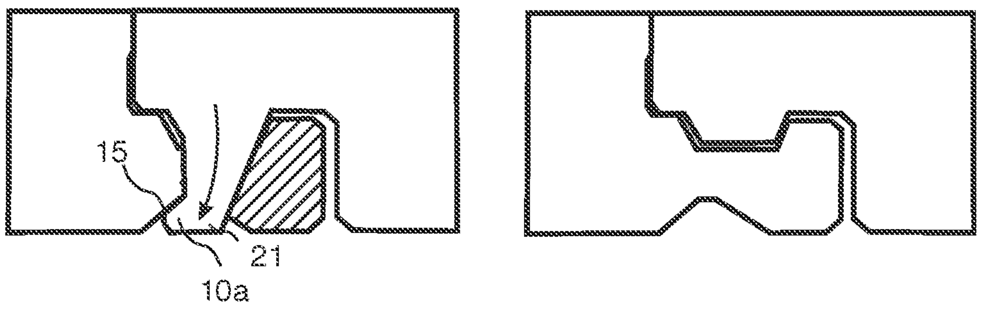

FIGS. 17*a-c* shows the locking of the locking system according to FIGS. 16*a-d*. A first set of sections A and the second set of sections B are displaced vertically wherein the protrusion 21 is displaced horizontally and inwardly during locking.

Figure 18A:
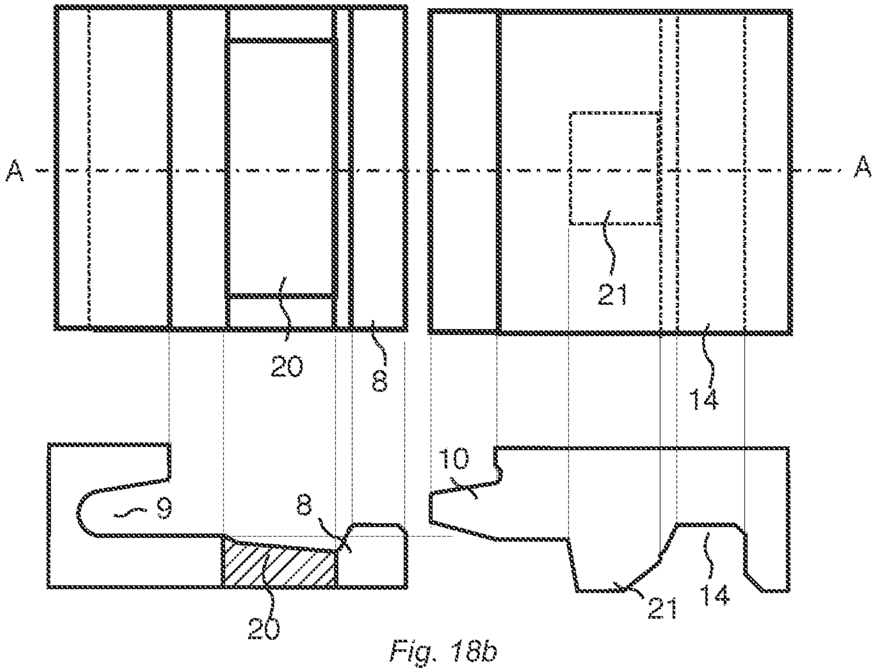
FIGS. 18*a-d* illustrate a locking system installed with angling.
Figure 18B:
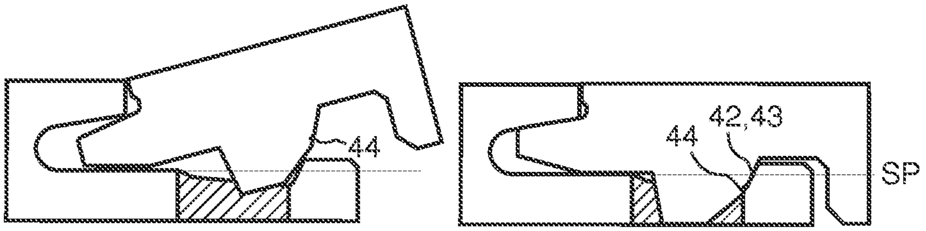
Figure 18C:
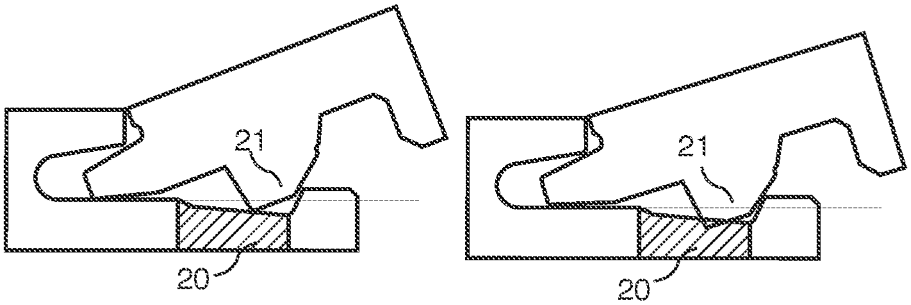
Figure 18D:
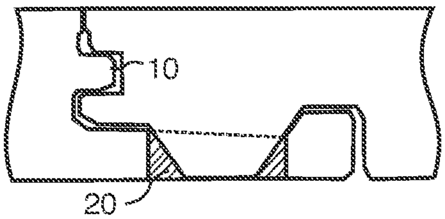

FIGS. 18*a-c* shows a locking system where the cavities 21 and protrusions 20 are mainly used to guide the floor panels during the angling action. The horizontal locking is accomplished with cooperating locking surfaces 42,43 on the locking element 8 and the locking groove 14 that are located above and below the strip plane SP. A strong locking may be obtained in plastic material with vertically extending locking surfaces that are only about 0.2-0.5 mm, especially if the locking angle 44 on a part of the locking surfaces is high, for example about 90 degrees as shown in FIG. 18*b*. The locking is only possible if a protrusion is positioned above a cavity. The locking may be accomplished in several steps. In case the protrusion 21 is not above the cavity 20 as shown in FIG. 18*c*, the panels will stay in an angled position. A displacement along the joint may thereafter take place and the protrusion 21 will automatically fall into the cavity 20 as shown in FIG. 18*c*. FIG. 18*d* shows that the tongue 10 may be formed on the edge comprising a cavity 20. This embodiment may be used to save material.

Figure 19:
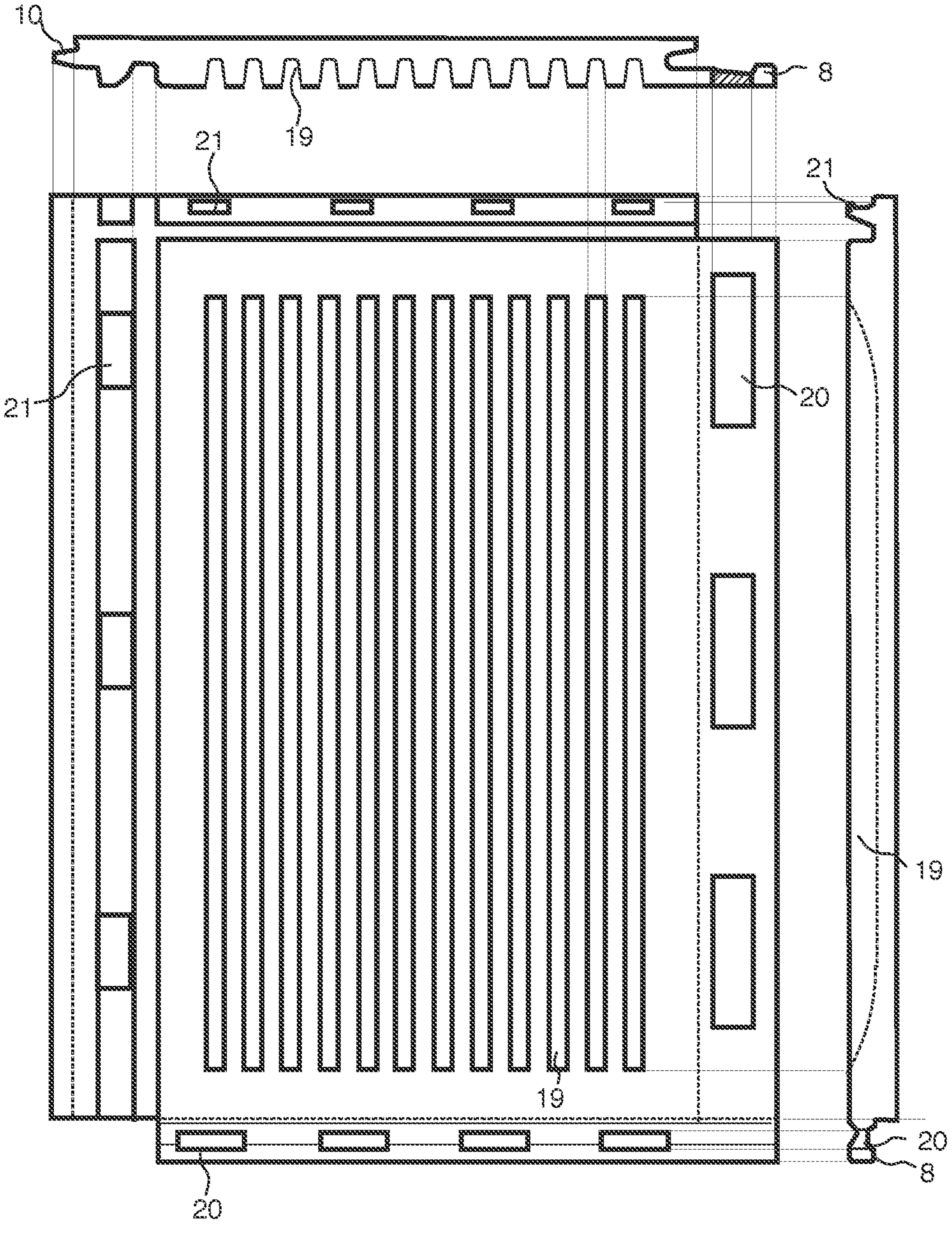
FIG. 19 illustrates grooves formed at the rear side.

FIG. 19 shows that flexing grooves 19 may be formed at the rear side with a length that is smaller than the length of the rear side. Such forming may be made with rotating jumping tools or with knives. The advantage is that the flexing grooves 19 are not formed in the edge sections where the locking system is formed. The flexing grooves 19 may be essentially parallel with the long edges and may have a length that is smaller than the distance between the locking systems on the short edges.

Figure 20A:
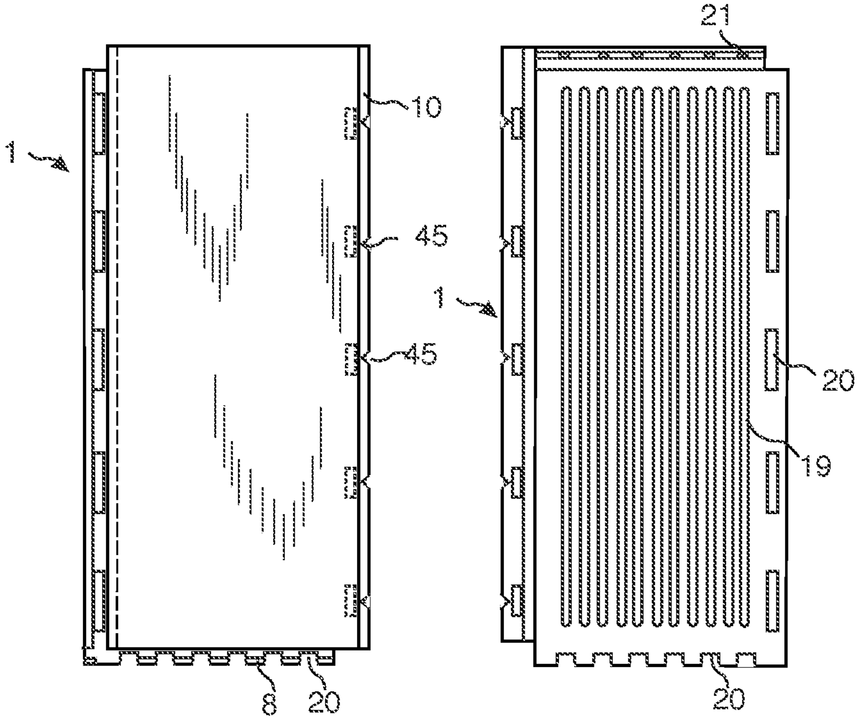
FIGS. 20*a-b* illustrate grooves formed at the rear side.
Figure 20B:
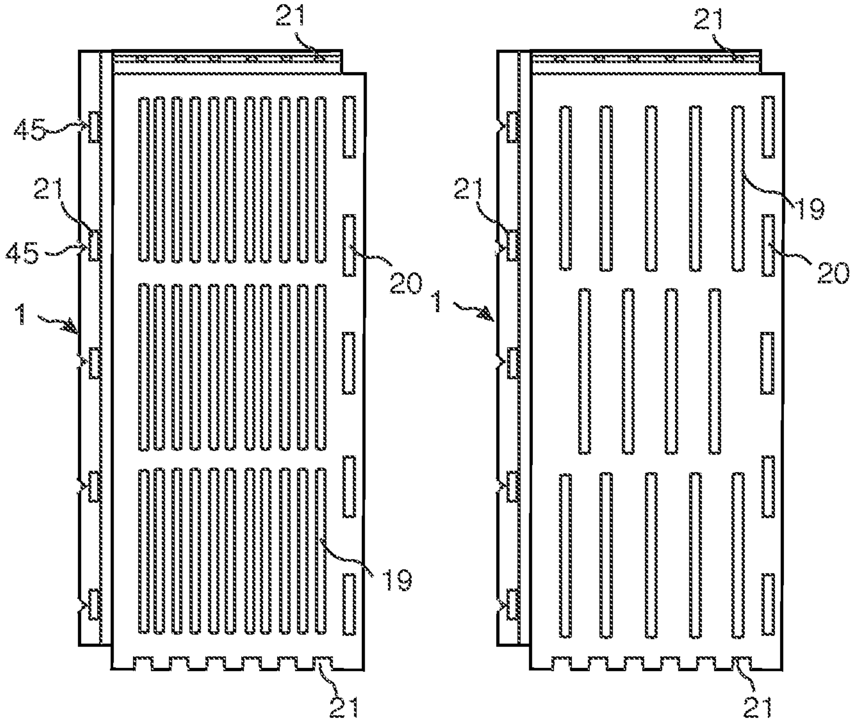
Figure 21A:
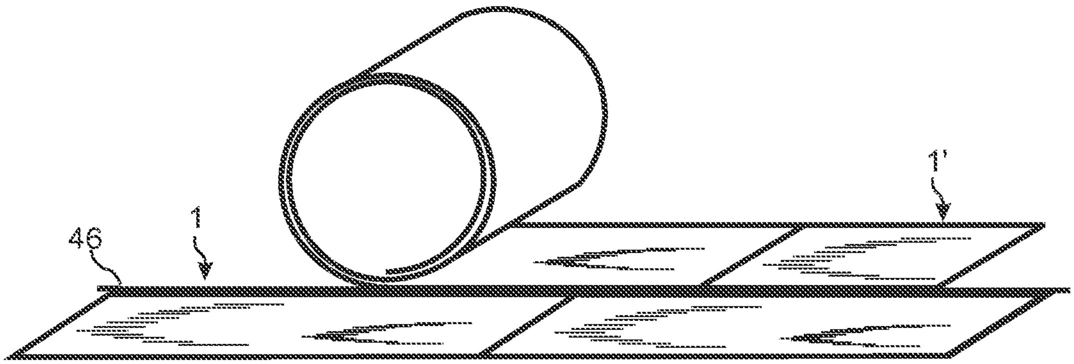
FIGS. 21*a-d* illustrate installation of a roll-formed resilient floor.
Figure 21B:
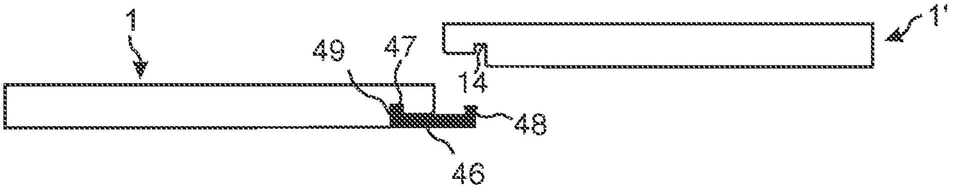
Figure 21C:
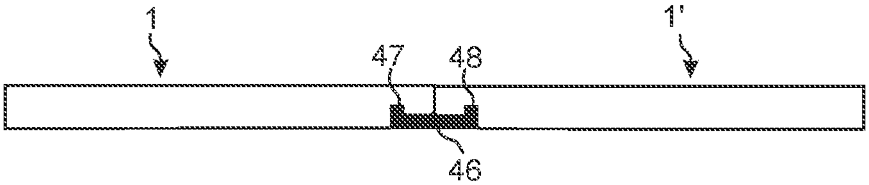
Figure 21D:
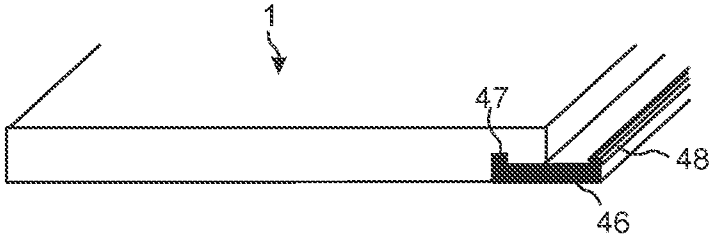

FIG. 20*a-b* show that position marks 45 may be formed by mechanical forming or with color spots on the tongue 10 such that they are visible from the front side. They may be used to position the protrusions 21 above the cavities 20. FIG. 20*b* shows that the flexing grooves 19 may be discontinues and arranged in various patterns.

FIG. 21*a-d* show that resilient floors may be delivered in rolls with overlapping short edges where each roll corresponds to one row. The rolls have preferably a width of 0.1-0.5 m and may comprise floor material that in installed position has a length of several meters. A preferred embodiment is a roll comprising a resilient flooring material, preferably PVC material, which in an unrolled and installed position has a length that is larger than 15 times the width. An even more preferred embodiment is a roll with an installed length that is larger than about 50 times the width. Such a roll may be about 0.2 m wide and about 10 m long and may comprise 2 m2 of flooring material. An extruded locking strip 46 comprising a first 47 and second 48 upwardly extending protrusions may be attached in a holding groove 49 in one edge of the roll. The first upwardly extending protrusion 47 is attached in a holding groove 49 of a first edge 1 and the second upwardly extending protrusion 48 is rolled and pressed during installation into a locking groove 14 formed in the adjacent edge 1' of a second roll. Such a combined pressing and rolling action facilitates the insertion of the protrusion 48 into the locking groove 14 since the protrusion is gradually inserted into the locking groove when the floor is unrolled.

Figure 22A:
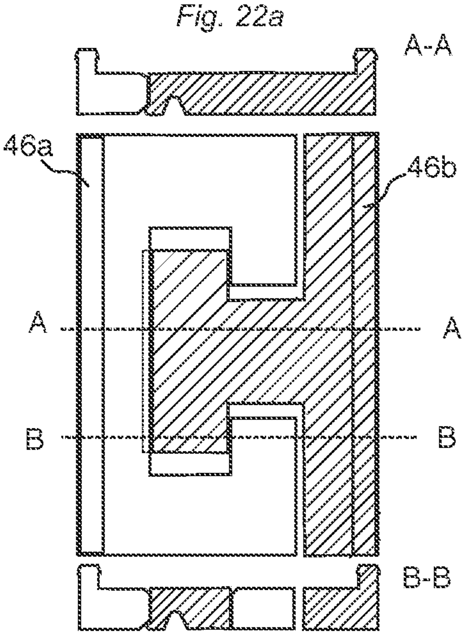
FIGS. 22*a-d* illustrate a locking system comprising extruded profiles.
Figure 22B:
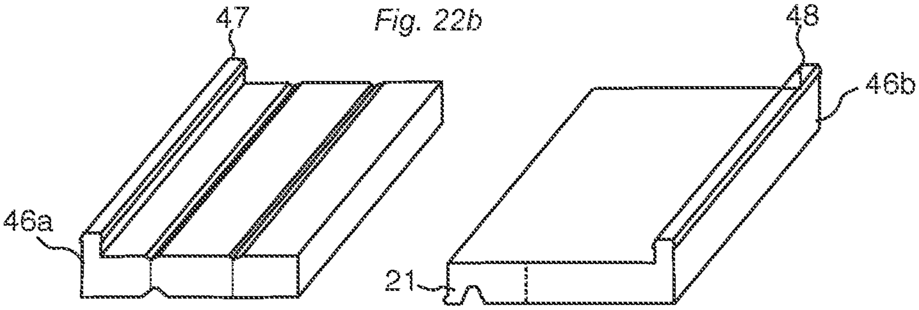
Figure 22C:
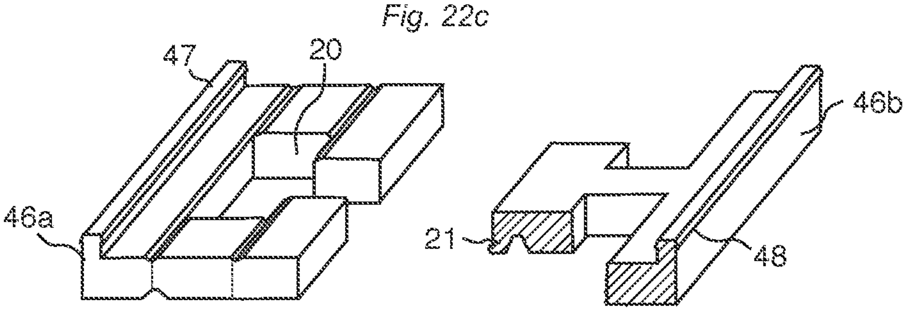
Figure 22D:
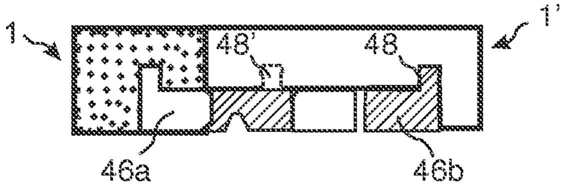

FIGS. 22*a*-22*d* shows that all the above described embodiments may be used to form locking strips 46*a*, 46*b* that may be attached on adjacent panel edges or roll edges as separate strips in order to provide a vertical and/or horizontal locking. FIGS. 22*b* and 22*c* shows that punching of an extruded plastic section may form locking strips comprising cavities 20 and protrusions 21. FIG. 22*d* shows the locking strips in a locked position. The locking system is locked by vertical displacement where the protrusions 21 are inserted into the cavities 20 with a rolling motion. The first upwardly extending protrusion 47 may be combined or replaced by glue or thermal bonding. The locking strips may comprise several upwardly extending protrusions 48', 48 as shown in FIG. 22*d*.

The methods above may also be used to lock linoleum floors and other resilient floors.

EMBODIMENTS

1. Building panels provided with a locking system for vertical and horizontal locking of a first edge and a second edge of adjacent panels, said locking system comprising:
   - a displaceable tongue at least partly arranged in a displacement groove,
   - a tongue groove,
   - a cavity provided in a strip at the first edge, and
   - a protrusion extending downwards at the second edge,
   - wherein the displaceable tongue is arranged to be displaced at least partly into the tongue groove during locking, and
   - wherein the protrusion is arranged to be located in least a portion of the cavity when the panels are locked vertically and horizontally.

2. Building panels according to embodiment 1, wherein the displacement groove is arranged in the first edge and the tongue groove is arranged in the second edge.

3. Building panels according to embodiment 1, wherein the displacement groove is arranged in the second edge and the tongue groove is arranged in the first edge.

4. Building panels according to embodiment 1, wherein the displaceable tongue is arranged to snap into the tongue groove during locking.

5. Building panels according to embodiment 1, wherein the displaceable tongue is flexible.

6. Building panels according to embodiment 1, wherein the displaceable tongue is separate.

7. Building panels according to embodiment 1, wherein the displaceable tongue is arranged to first be displaced at least partly into the displacement groove and then at least partly into the tongue groove during locking.

8. Building panels according to embodiment 1, wherein the displacement groove extends horizontally.

9. Building panels according to embodiment 1, wherein the displacement groove is provided above the strip when the panels are locked vertically and horizontally.

10. Building panels according to embodiment 1, wherein a lower part of the displacement groove is located in the same horizontal plane as an upper part of the strip when the panels are locked vertically and horizontally.

11. Building panels according to embodiment 1, wherein the displaceable tongue comprises an inner flexible part.

12. Building panels according to embodiment 1, wherein the cavity extends entirely through the strip.

13. Building panels according to embodiment 1, wherein the strip comprises a locking element arranged to cooperate with a downwardly open locking groove formed in the second edge for horizontal locking.

14. Building panels according to embodiment 13, wherein the locking element is continuous along the first edge.

15. Building panels according to embodiment 1, wherein a thickness of the strip is the same outside of the cavity and inside of the cavity.

16. Building panels according to embodiment 1, wherein a thickness of the strip is larger outside of the cavity than inside of the cavity.

17. Building panels according to embodiment 1, wherein the tongue groove is provided above the strip when the panels are locked vertically and horizontally.

18. Building panels according to embodiment 1, wherein a lower part of the tongue groove is located in the same horizontal plane as an upper part of the strip when the panels are locked vertically and horizontally.

19. Building panels according to embodiment 1, wherein said locking system comprises:
   - a plurality of cavities provided in the strip, and
   - a plurality of protrusions extending downwards at the second edge,
   - wherein each protrusion is arranged to be located in at least a portion of a corresponding cavity when the panels are locked vertically and horizontally.

20. Building panels according to embodiment 1, wherein the building panels are locked by means of a vertical displacement of the second panel relative to the first panel.

The invention claimed is:

1. Floor panels comprising a locking system for vertical and/or horizontal locking of a first edge and a second edge of adjacent floor panels, the adjacent floor panels comprising a plastic wear layer and one or several plastic core layers, the plastic wear layer and the one or several plastic core layers comprising a plastic material,
   - wherein one plastic core layer comprises several essentially vertical flexing grooves, the vertical flexing grooves being formed at a rear side of the plastic core layer,
   - wherein the vertical flexing grooves have a vertical extension of at least about one third of a thickness of said one or several plastic core layers, and
   - wherein the vertical flexing grooves are pressed.

2. The floor panels as claimed in claim 1, wherein said plastic wear layer comprises polyvinyl chloride.

3. The floor panels as claimed in claim 1, wherein said one or several plastic core layers comprise polyvinyl chloride and fillers.

4. The floor panels as claimed in claim 1, wherein the vertical flexing grooves are covered with an underlay.

5. The floor panels as claimed in claim 4, wherein the underlay is a foam.

6. The floor panels as claimed in claim 1, wherein a length of the vertical flexing grooves is smaller than a length of the rear side.

7. The floor panels as claimed in claim 1, wherein the vertical flexing grooves are essentially parallel with long edges of the floor panels.

8. The floor panels as claimed in claim 7, wherein the vertical flexing grooves have a longitudinal length that is smaller than a longitudinal length of the rear side of said one or several plastic core layers.

9. The floor panels as claimed in claim 1, wherein the floor panels comprise one or several separate layers of glass fibre.

10. The floor panels as claimed in claim 1, wherein the floor panels further comprise a subcode.

11. The floor panels as claimed in claim 1, wherein the vertical flexing grooves are continuous.

12. The floor panels as claimed in claim 1, wherein the vertical flexing grooves are discontinuous.

13. The floor panels as claimed in claim 12, wherein the vertical flexing grooves are arranged in a plurality of rows along a longitudinal direction of the floor panel, each row comprising a plurality of vertical flexing grooves.

14. The floor panels as claimed in claim 12, wherein vertical flexing grooves in adjacent rows extend side by side along the longitudinal direction.

15. The floor panels as claimed in claim 12, wherein vertical flexing grooves in adjacent rows are offset with respect to each other along the longitudinal direction.

16. The floor panels as claimed in claim 1, wherein a length of the vertical flexing grooves is smaller than a distance between locking systems on short edges of the floor panels.

17. The floor panels as claimed in claim 1, wherein the vertical flexing grooves are curved at the edges along a longitudinal direction.

18. The floor panels as claimed in claim 1, wherein the vertical flexing grooves each have converging opposing lateral walls extending from the rear side of the plastic core layer.

* * * * *